(12) United States Patent
Kim et al.

(10) Patent No.: US 12,284,607 B2
(45) Date of Patent: *Apr. 22, 2025

(54) WIRELESS COMMUNICATION METHOD FOR SAVING POWER AND WIRELESS COMMUNICATION TERMINAL USING SAME

(71) Applicants: WILUS INSTITUTE OF STANDARDS AND TECHNOLOGY INC., Gyeonggi-do (KR); SK TELECOM CO., LTD., Seoul (KR)

(72) Inventors: Yongho Kim, Gyeonggi-do (KR); Jinsam Kwak, Gyeonggi-do (KR); Juhyung Son, Gyeonggi-do (KR)

(73) Assignees: WILUS INSTITUTE OF STANDARDS AND TECHNOLOGY INC., Gyeonggi-do (KR); SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/381,164

(22) Filed: Oct. 17, 2023

(65) Prior Publication Data

US 2024/0073809 A1   Feb. 29, 2024

Related U.S. Application Data

(63) Continuation of application No. 17/985,424, filed on Nov. 11, 2022, now Pat. No. 11,832,176, which is a (Continued)

(30) Foreign Application Priority Data

Jun. 20, 2014 (KR) .......................... 10-2014-0076101
Jun. 23, 2014 (KR) .......................... 10-2014-0076388

(Continued)

(51) Int. Cl.
*H04W 52/02* (2009.01)
*H04W 72/0446* (2023.01)
(Continued)

(52) U.S. Cl.
CPC ....... *H04W 52/02* (2013.01); *H04W 72/0446* (2013.01); *H04W 84/12* (2013.01);
(Continued)

(58) Field of Classification Search
CPC . H04W 52/02; H04W 72/0446; H04W 84/12; H04W 74/006
See application file for complete search history.

(56) References Cited

U.S. PATENT DOCUMENTS 9,820,302 B2    11/2017   Choi et al.
10,313,966 B2   6/2019    Kim et al.
(Continued)

FOREIGN PATENT DOCUMENTS

JP      2012-80415       4/2012
KR   10-2008-0080726     9/2008
(Continued)

OTHER PUBLICATIONS

International Search Report for PCT/KR2015/006290 mailed on Oct. 15, 2015 and its English translation from WIPO.
(Continued)

*Primary Examiner* — Mohammad S Anwar
(74) *Attorney, Agent, or Firm* — WOMBLE BOND DICKINSON (US) LLP

(57) ABSTRACT

The present invention relates to a wireless communication method for power saving and a wireless communication terminal using the same, and more particularly, to a wireless communication method for efficiently conducting data transmission/reception of each terminal in a high density environment and a wireless communication terminal using the (Continued)

same. To this end, the present invention provides a wireless communication method for a terminal including receiving a distributed access group parameter for data transmission/reception by a group unit, wherein the distributed access group parameter comprises information about a number of groups assigned to a corresponding BSS, obtaining group information about the terminal based on the distributed access group parameter, and performing data transmission based on the obtained group information, and a wireless communication terminal using the same.

8 Claims, 31 Drawing Sheets

Related U.S. Application Data continuation of application No. 17/070,909, filed on Oct. 14, 2020, now Pat. No. 11,523,335, which is a continuation of application No. 16/390,591, filed on Apr. 22, 2019, now Pat. No. 10,849,060, which is a continuation of application No. 15/320,318, filed as application No. PCT/KR2015/006290 on Jun. 22, 2015, now Pat. No. 10,313,966.

(30) Foreign Application Priority Data

Jun. 27, 2014 (KR) .................. 10-2014-0080250
Jul. 4, 2014 (KR) .................. 10-2014-0083847

(51) Int. Cl.
    *H04W 74/00* (2009.01)
    *H04W 84/12* (2009.01)
    *H04W 88/02* (2009.01)

(52) U.S. Cl.
    CPC .......... *H04W 74/006* (2013.01); *H04W 88/02* (2013.01); *Y02D 30/70* (2020.08)

(56) References Cited

U.S. PATENT DOCUMENTS

| | | | |
|---|---|---|---|
| 10,849,060 B2 | 11/2020 | Kim et al. | |
| 11,523,335 B2 | 12/2022 | Kim et al. | |
| 11,832,176 B2* | 11/2023 | Kim | H04W 84/12 |
| 2005/0059437 A1 | 3/2005 | Son et al. | |
| 2005/0237984 A1 | 10/2005 | Benveniste | |
| 2006/0252449 A1 | 11/2006 | Ramesh | |
| 2007/0218860 A1 | 9/2007 | Wentink | |
| 2007/0281617 A1 | 12/2007 | Meylan et al. | |
| 2008/0130603 A1 | 6/2008 | Wentink et al. | |
| 2008/0212477 A1 | 9/2008 | Yun et al. | |
| 2010/0265907 A1 | 10/2010 | Meier | |
| 2012/0044925 A1 | 2/2012 | Lee et al. | |
| 2012/0188925 A1 | 7/2012 | Lee et al. | |
| 2013/0208637 A1 | 8/2013 | Abraham et al. | |
| 2013/0229996 A1 | 9/2013 | Wang et al. | |
| 2013/0235773 A1 | 9/2013 | Wang et al. | |
| 2013/0329620 A1 | 12/2013 | Kim et al. | |
| 2014/0092797 A1 | 4/2014 | Chu et al. | |
| 2014/0153512 A1 | 6/2014 | Koskela et al. | |
| 2014/0292797 A1 | 10/2014 | Zimmer et al. | |
| 2014/0307653 A1 | 10/2014 | Liu et al. | |
| 2015/0071211 A1 | 3/2015 | Seok | |
| 2015/0103767 A1 | 4/2015 | Kim et al. | |
| 2015/0208436 A1 | 7/2015 | Seok | |
| 2015/0282157 A1 | 10/2015 | Kim et al. | |
| 2015/0319700 A1 | 11/2015 | Oteri et al. | |
| 2017/0195991 A1 | 7/2017 | Ahn et al. | |
| 2017/0202026 A1 | 7/2017 | Ahn et al. | |
| 2017/0208542 A1 | 7/2017 | Kim et al. | |
| 2017/0325264 A1 | 11/2017 | Cherian et al. | |
| 2017/0373736 A1 | 12/2017 | Fang | |
| 2019/0253963 A1 | 8/2019 | Kim et al. | |
| 2021/0029631 A1 | 1/2021 | Kim et al. | |
| 2023/0071979 A1 | 3/2023 | Kim et al. | |

FOREIGN PATENT DOCUMENTS

| | | |
|---|---|---|
| KR | 10-2011-0084252 | 7/2011 |
| KR | 10-2012-0072331 | 7/2012 |
| KR | 10-2012-0094002 | 8/2012 |
| KR | 10-1382882 | 4/2014 |
| KR | 10-2015-0058200 | 5/2015 |

OTHER PUBLICATIONS

Written Opinion of the International Searching Authority for PCT/KR2015/006290 mailed on Oct. 15, 2015 and its English machine translation by Google Translate.
International Preliminary Report on Patentability (Chapter I) for PCT/KR2015/006290 issued on Dec. 20, 2016 and its English translation from WIPO.
Patil Sandhya, "DL MU TXOP Power Save", IEEE 802.11-10/1302r0, Nov. 8, 2010.
Office Action dated Jun. 23, 2020 for Korean Patent Application No. 10-2020-7006109 and its English translation.
Office Action dated Jun. 23, 2020 for Korean Patent Application No. 10-2020-7006111 and its English translation.
Notice of Allowance dated Jul. 13, 2020 for U.S. Appl. No. 16/390,591 (now published as 2019/0253963).
Non-Final Office Action dated Mar. 17, 2020 for U.S. Appl. No. 16/390,591 (now published as 2019/0253963).
Notice of Allowance dated Jan. 23, 2019 for U.S. Appl. No. 15/320,318 (now published as 2017/0208542).
Final Office Action dated Oct. 15, 2018 for U.S. Appl. No. 15/320,318 (now published as 2017/0208542).
Non-Final Office Action dated Apr. 18, 2018 for U.S. Appl. No. 15/320,318 (now published as 2017/0208542).
Notice of Allowance dated Dec. 26, 2019 for Korean Patent Application No. 10-2016-7035117 and its English translation provided by Applicant's foreign counsel.
Notice of Allowance for Korean Patent Application No. 10-2020-7006109 mailed on Nov. 26, 2020 and its English translation provided by Applicant's foreign counsel.
Office Action for Korean Patent Application No. 10-2021-7007669 mailed on Jun. 24, 2021 and its English translation provided by Applicant's foreign counsel.
Notice of Allowance dated Aug. 17, 2022 for U.S. Appl. No. 17/070,909 (now published as 2021/0029631).
Office Action dated Apr. 19, 2022 for U.S. Appl. No. 17/070,909 (now published as 2021/0029631).
Office Action dated Jun. 24, 2023 for Korean Patent Application No. 10-2023-7017218 and its English translation provided by Applicant's foreign counsel.
Notice of Allowance dated Sep. 11, 2023 for U.S. Appl. No. 17/985,424 (now published as 2023/0071979).
Office Action dated May 5, 2023 for U.S. Appl. No. 17/985,424 (now published as 2023/0071979).
Office Action dated Jun. 27, 2024 for Korean Patent Application No. 10-2023-7017218 and its English translation provided by Applicant's foreign counsel.

* cited by examiner

WIRELESS COMMUNICATION METHOD FOR SAVING POWER AND WIRELESS COMMUNICATION TERMINAL USING SAME

TECHNICAL FIELD

The present invention relates to a wireless communication method for power saving and a wireless communication terminal using the same, and more particularly, to a wireless communication method for efficiently conducting data transmission/reception of each terminal in a high density environment and a wireless communication terminal using the same.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a radio interface accepted by 802.11n, such as a wider radio frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless LAN standards after the 802.11ac and 802.11ad, discussion for providing a high-efficiency and high-performance wireless LAN communication technology in a high-density environment is continuously performed. That is, in a next-generation wireless LAN environment, communication having high frequency efficiency needs to be provided indoors/outdoors under the presence of high-density stations and access points (APs) and various technologies for implementing the communication are required.

DISCLOSURE

Technical Problem

The present invention provides wireless LAN communication with high efficiency/high performance in a high density environment.

The present invention also provides a method for efficiently conducting data transmission/reception of terminals in a power saving mode.

The present invention also provides a method for reducing the possibility of collision during data transmission by a plurality of terminals in a dense user environment and providing a stable data communication environment.

In addition, the present invention also enables a plurality of terminals to perform distributed data transmission using multi-channels.

Technical Solution

In order to solve the above-described technical problems, the present invention provides the following wireless communication method and wireless communication terminal.

The present invention provides a wireless communication method for a terminal including: receiving a distributed access group parameter for data transmission/reception by a group unit, wherein the distributed access group parameter comprises information of the number of groups assigned to a corresponding BSS; obtaining group information of the terminal based on the distributed access group parameter; and performing data transmission based on the obtained group information.

In addition, the present invention provides a wireless communication terminal including: a transceiver for transmitting and receiving a wireless signal; and a processor for controlling an operation of the terminal, wherein the processor receives a distributed access group parameter for data transmission/reception by a group unit, wherein the distributed access group parameter comprises information of the number of groups assigned to a corresponding BSS, obtains group information of the terminal based on the distributed access group parameter, and performs data transmission based on the obtained group information.

In an embodiment of the present invention, the performing data transmission may be characterized in that at least one terminal having identical group information participates in the data transmission during a predetermined access period.

In an embodiment of the present invention, the at least one terminal having the identical group information may simultaneously transmit data by using different channels with each other.

In an embodiment of the present invention, the at least one terminal having the identical group information may sequentially transmit data.

In an embodiment of the present invention, the at least one terminal having identical group information may perform a backoff procedure for the data transmission during the predetermined access period.

In an embodiment of the present invention, the distributed access group parameter may further comprise inter-group access offset information, wherein the predetermined access period is terminated when a channel is idle for the inter-group access offset time.

In an embodiment of the present invention, the predetermined access period may be set to be a fixed time value.

In an embodiment of the present invention, when the predetermined access period is terminated, terminals having group information of a next access order may participate in the data transmission.

In an embodiment of the present invention, the group information of the terminal may be determined based on information of the number of groups and identifier information of the terminal.

In an embodiment of the present invention, the group information of the terminal may be determined based on a value obtained by modulo-operating the identifier information of the terminal with the number of groups.

In an embodiment of the present invention, the information of the number of groups may be changed based on a duration of an access period of an individual group.

In an embodiment of the present invention, the distributed access group parameter may be transmitted through a beacon or a probe response.

In an embodiment of the present invention, the distributed access group parameter may further comprise access start offset information representing a time point at which terminals of each group start access.

Next, the present invention provides a wireless communication method for a target terminal including: receiving a trigger frame for indicating downlink data to be transmitted to each terminal of a BSS through multi-channels; obtaining target channel information for receiving the downlink data, when the trigger frame indicates that there is downlink data to be transmitted to the target terminal; and receiving the downlink data through the target channel.

In addition, the present invention provides the target terminal for wireless communication including: a transceiver for transmitting and receiving a wireless signal; and a processor for controlling an operation of the target terminal, wherein the processor receives a trigger frame for indicating downlink data to be transmitted to each terminal of a BSS through multi-channels, obtains information of a target channel for receiving the downlink data, when the trigger frame indicates that there is downlink data to be transmitted to the target terminal, and receives the downlink data through the target channel.

At this point, each of the terminals in the BSS, which include the target terminal, may simultaneously receive downlink data using the multi-channels.

In addition, the wireless communication method may further include transmitting, through the target channel, a data request frame which represents presence of the target terminal in response to the trigger frame.

At this point, the wireless communication method may further include performing a backoff procedure in the target channel to transmit the data request frame.

Here, when a backoff counter in the backoff procedure has expired and the target terminal has transmitted the data request frame, downlink data may be received to the target terminal through the target channel.

According to an embodiment, the target channel may be determined based on an identifier of the target terminal and information of the number of available channels in the BSS.

In detail, the target channel may be determined based on a value obtained by modulo-operating the identifier of the target terminal with the information of the number of the available channels.

At this point, the identifier of the target terminal may be any one of a MAC address or an association ID of the target terminal.

According to another embodiment, the target channel may be determined based on an order in which the target terminal is indicated in the trigger frame and information of the number of the available channels in the BSS.

In detail, the target channel may be determined based on a value obtained by modulo-operating the order in which the target terminal is indicated among terminals, which are indicated by the trigger frame that there is downlink data to be transmitted, with the information of the number of the available channels in the BSS.

According to an embodiment, the trigger frame may be a traffic indication map (TIM).

In addition, the trigger frame may include the information of the number of the available channels in the BSS.

In addition, the data request frame may be a PS-Poll.

According to an embodiment of the present invention, each of the terminals in the BSS may be a terminal in a power saving mode.

According to another embodiment of the present invention, the transmission of the data request frame and reception of the downlink data may be respectively performed in separately allocated periods.

In addition, a period of the transmission of the data request frame and a period of the reception of the downlink data may be repeated a plurality of times.

At this point, information of the number of repetitions may be included in the trigger frame.

According to an embodiment, the data request frame may include duration information until the end of the data request frame transmission period and each terminal in the BSS having received the data request frame may set a Network Allocation Vector (NAV) based on the duration information.

At this point, the data request frame may include a combined transmitter address field, and the combined transmitter address field may be configured to include an association ID of a terminal that transmits the data request frame and partial lower information of a MAC address of the terminal.

According to an embodiment of the present invention, the downlink data may be aggregated data for a plurality of terminals.

At this point, the aggregated data includes an A-MPDU configured by aggregating a plurality of MPDUs for each terminal.

In addition, the aggregated data is configured by aggregating a plurality of A-MPDUs.

According to an embodiment of the present invention, an RTS-to-self frame for setting the data request frame transmission period may be further received.

At this point, both a receiver address and a transmitter address of the RTS-to-self frame may be set to a MAC address of an AP operating the BSS.

In addition, duration field of the RTS-to-self frame may represent a time until the end of the data request frame transmission period.

According to another embodiment of the present invention, the data request frame transmission period may be configured with at least one slot and a transmission opportunity of data request frame of one terminal is assigned for each slot.

At this point, the trigger frame may include a slot number field representing information on how many slots configure the data request frame transmission period in a time axis.

In addition, a sequence of the data request frame transmission period allocated to the terminal may be determined based on the number of slots, the number of available channels in the BSS, and an order in which the target terminal is indicated in the trigger frame.

In addition, a target channel and a slot through which the terminal will transmit the data request frame in the allocated sequence may be determined based on the number of slots, the number of available channels in the BSS, and an order in which the target terminal is indicated in the trigger frame.

Advantageous Effects

According to an embodiment of the present invention, it is possible to reduce the time required for access by reducing the possibility of collision of data transmission between terminals in a dense user environment.

In addition, according to an embodiment of the present invention, since a period in which terminals with data to be received can transmit data request frames is guaranteed, each terminal may swiftly receive data.

In addition, according to an embodiment of the present invention, since data for a plurality of terminals is aggregated to be transmitted, an overhead for data transmission may be reduced.

According to an embodiment of the present invention, the entire resource utilization ratio may be increased and performance of a wireless LAN system may be improved in a contention-based channel access system.

BEST MODE

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

This application claims priority to and the benefit of Korean Patent Application Nos. 10-2014-0076101, 10-2014-0076388, 10-2014-0080250 and 10-2014-0083847 filed in the Korean Intellectual Property Office and the embodiments and mentioned items described in the respective applications are included in the Detailed Description of the present application.

Figure 1:
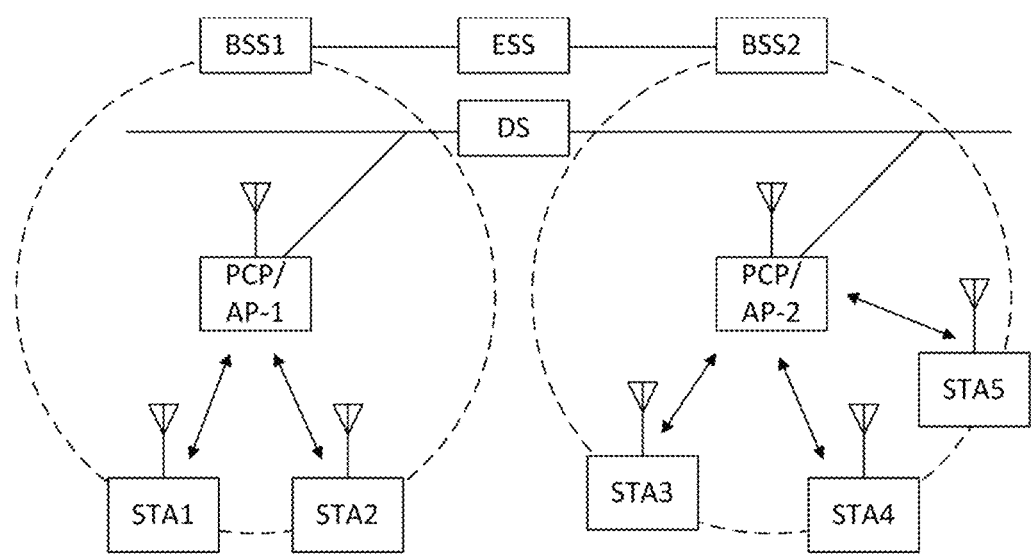
FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a radio medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
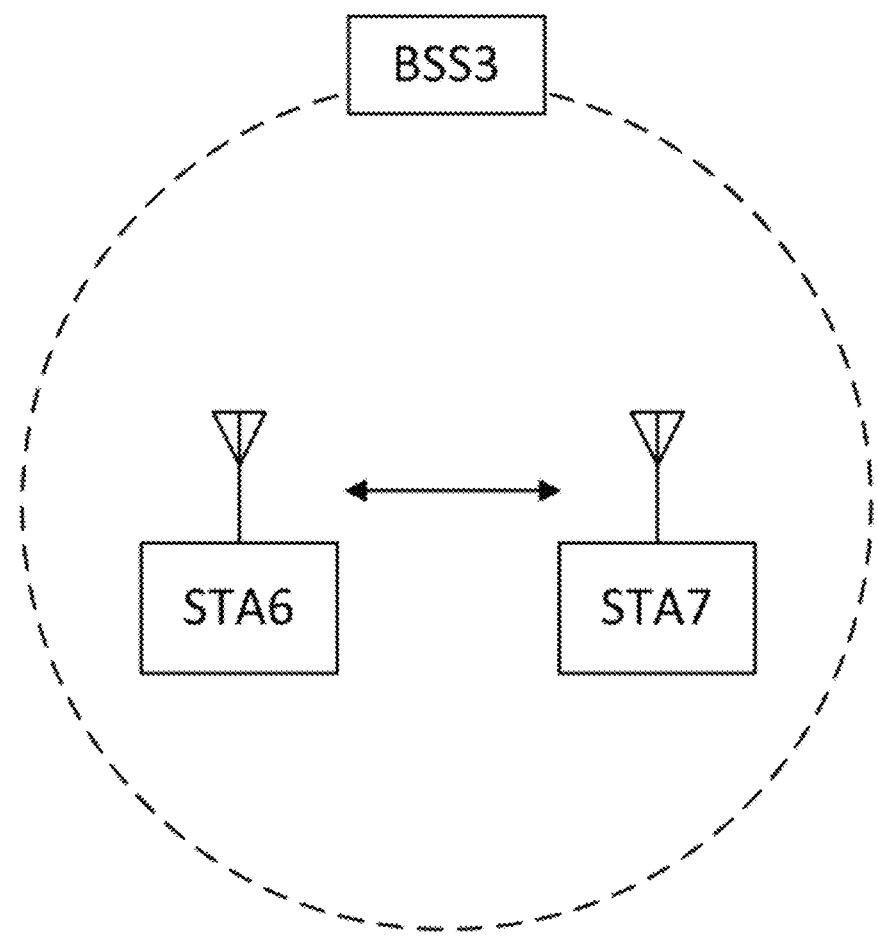
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
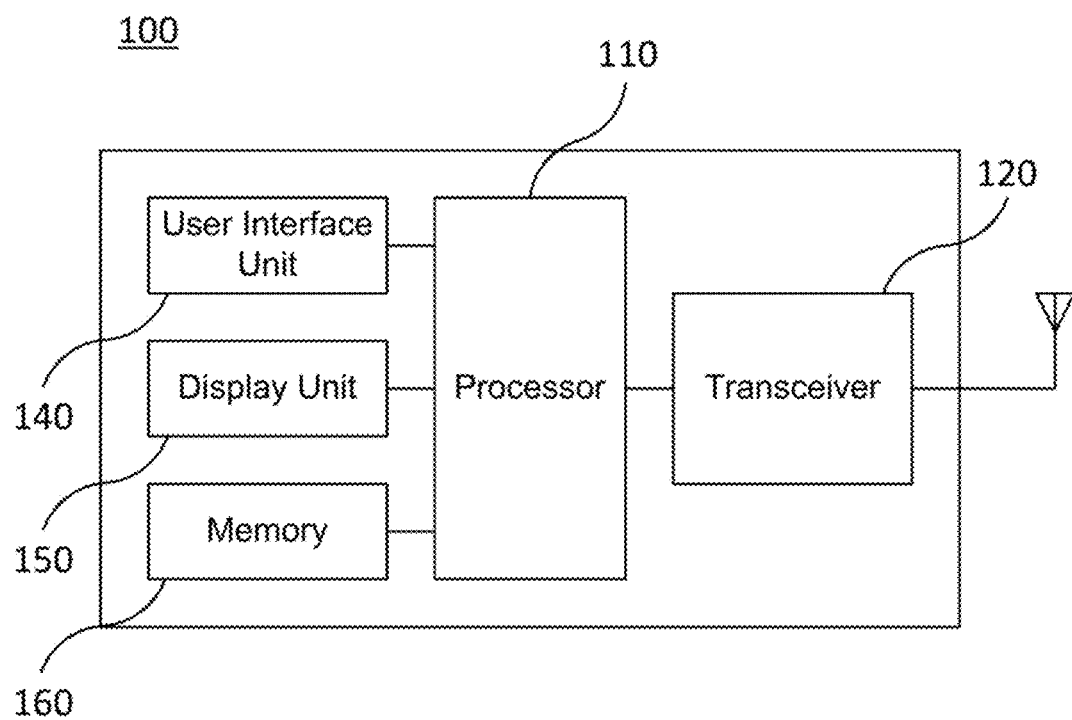
FIG. 3 is a block diagram illustrating a configuration of a station according to an embodiment of the present invention.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a radio signal such as a wireless LAN packet, or the like and may be embedded in the station 100 or provided as an exterior. According to the embodiment, the transceiver 120 may include at least one transmit/receive module using different frequency bands. For example, the transceiver 120 may include transmit/receive modules having different frequency bands such as 2.4 GHz, 5 GHz, and 60 GHz. According to an embodiment, the station 100 may include a transmit/receive module using a frequency band of 6 GHz or more and a transmit/receive module using a frequency band of 6 GHz or less. The respective transmit/receive modules may perform wireless communication with the AP or an external station according to a wireless LAN standard of a frequency band supported by the corresponding transmit/receive module. The transceiver 120 may operate only one transmit/receive module at a time or simultaneously operate multiple transmit/receive modules together according to the performance and requirements of the station 100. When the station 100 includes a plurality of transmit/receive modules, each transmit/receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 controls various operations of radio signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
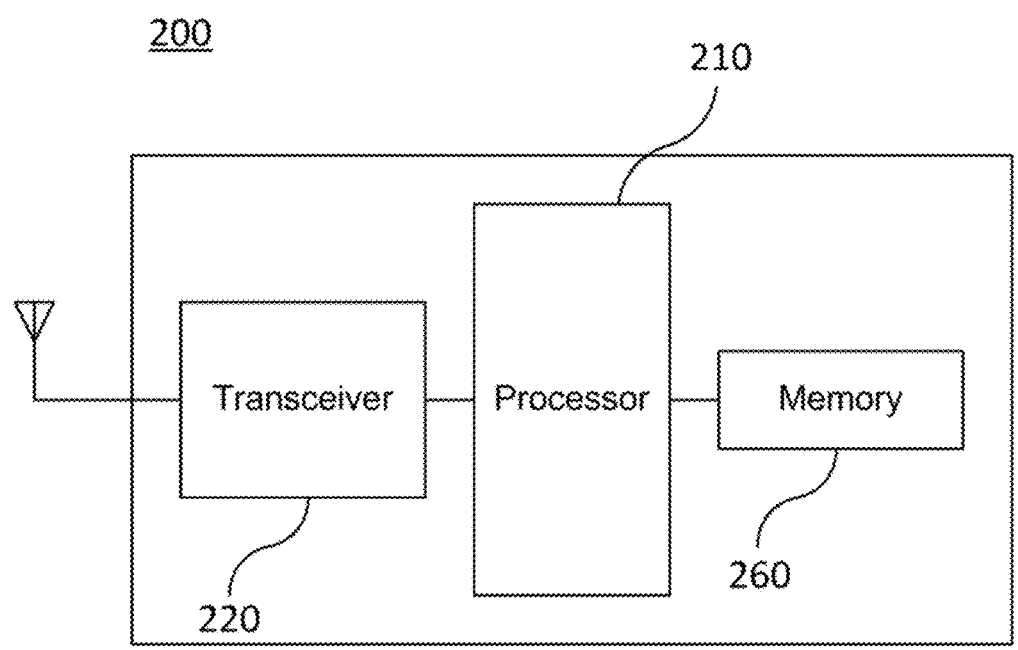
FIG. 4 is a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit/receive modules using different frequency bands. That is, the AP 200 according to the embodiment of the present invention may include two or more transmit/receive modules among different frequency bands, for example, 2.4 GHz, 5 GHz, and 60 GHz together. Preferably, the AP 200 may include a transmit/receive module using a frequency band of 6 GHz or more and a transmit/receive module using a frequency band of 6 GHz or less. The respective transmit/receive modules may perform wireless communication with the station according to a wireless LAN standard of a frequency band supported by the corresponding transmit/receive module. The transceiver 220 may operate only one transmit/receive module at a time or simultaneously operate multiple transmit/receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 controls various operations such as radio signal transmission/reception of the AP 200 according to the embodiment of the present invention. A detailed embodiment thereof will be described below.

Figure 5:
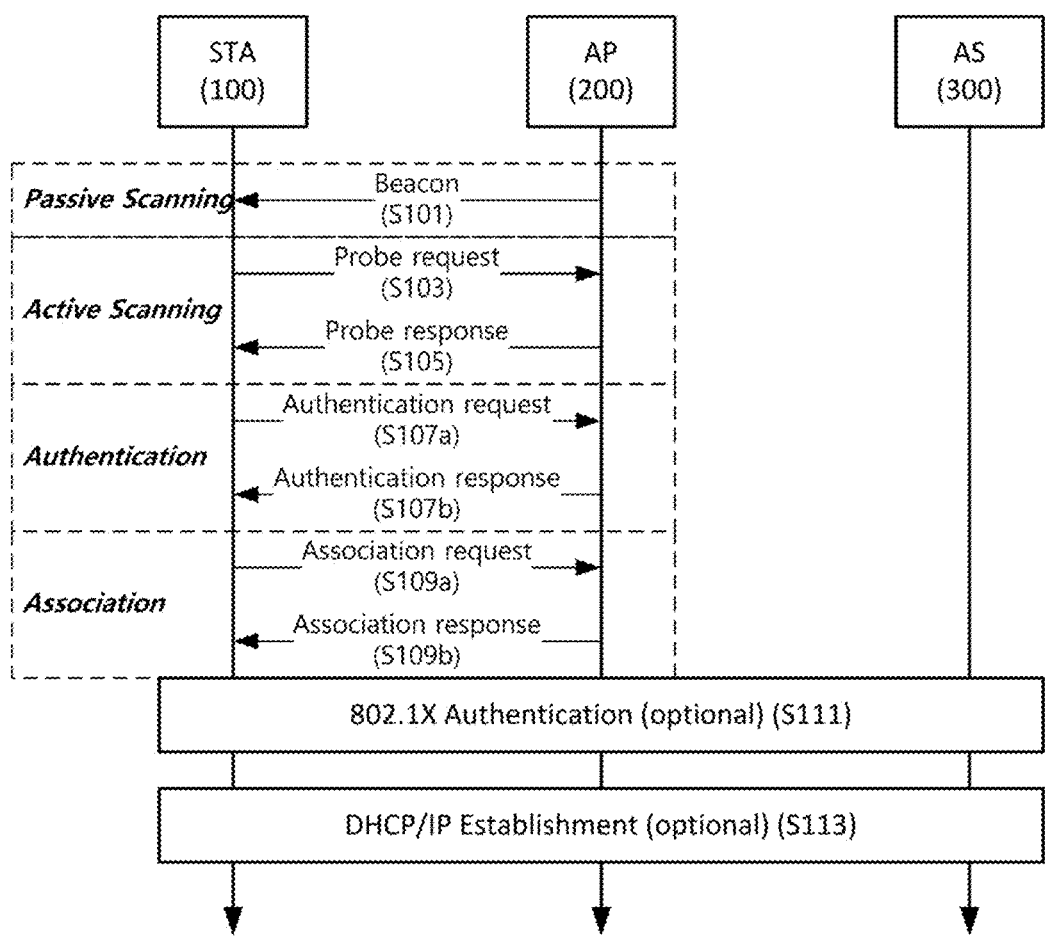
FIG. 5 schematically illustrates a process in which a STA establishes a link with an AP.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
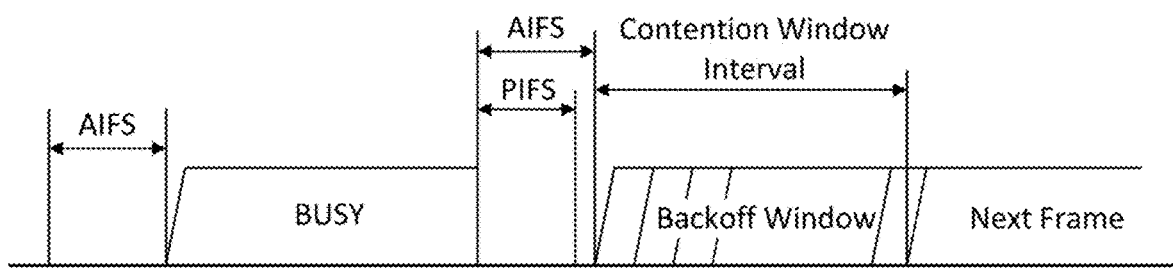
FIG. 6 illustrates a Carrier Sense Multiple Access (CSMA)/Collision Avoidance (CA) method used in a wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a radio signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a radio signal having the CCA threshold or more, which is received by the terminal, indicates the corresponding terminal as a receiver, the terminal processes the received radio signal. Meanwhile, when a radio signal is not sensed in the corresponding channel or a radio signal having a strength smaller than the CCA threshold is sensed, it is determined that the channel is idle.

When it is determined that the channel is idle, each terminal having data to be transmitted performs a backoff procedure after an interframe space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number allocated to the corresponding terminal during an interval of an idle state of the channel and a terminal that completely exhausts the slot time(s) attempts to access the corresponding channel. As such, an interval in which each terminal performs the backoff procedure is referred to as a contention window interval.

When a specific terminal successfully accesses the channel, the corresponding terminal may transmit data through the channel. However, when the terminal which attempts the access collides with another terminal, the terminals which collide with each other are allocated with new random numbers, respectively to perform the backoff procedure again. According to an embodiment, a random number newly allocated to each terminal may be decided within a range (2*CW) which is twice larger than a range (a contention window, CW) of a random number which the corresponding terminal is previously allocated with. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Figure 7:
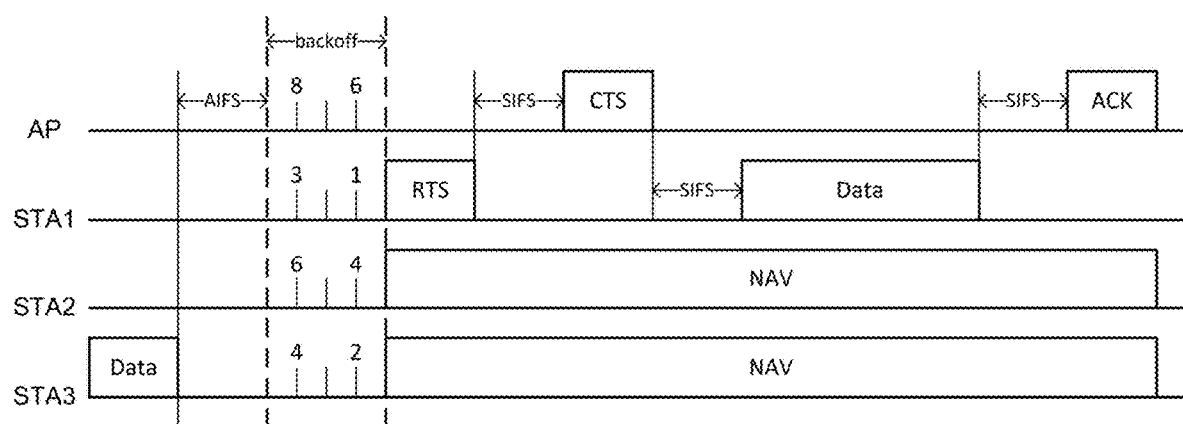
FIG. 7 illustrates a method for performing a Distributed Coordination Function (DCF) using a Request to Send (RTS) frame and a Clear to Send (CTS) frame.

FIG. 7 is a diagram illustrating a method for performing a distributed coordination function using a request to send (RTS) frame and a clear to send (CTS) frame.

The AP and STAs in the BSS contend in order to obtain an authority for transmitting data. When data transmission at the previous step is completed, each terminal having data to be transmitted performs a backoff procedure while decreasing a backoff counter (alternatively, a backoff timer) of a random number allocated to each terminal after an AFIS time. A transmitting terminal in which the backoff counter has expired transmits the request to send (RTS) frame to notify that corresponding terminal has data to transmit. According to an exemplary embodiment of FIG. 7, STA1 which holds a lead in contention with minimum backoff may transmit the RTS frame after the backoff counter has expired. The RTS frame includes information on a receiver address, a transmitter address, and duration. A receiving terminal (i.e., the AP in FIG. 7) that receives the RTS frame transmits the clear to send (CTS) frame after waiting for a short IFS (SIFS) time to notify that the data transmission is available to the transmitting terminal STA1. The CTS frame includes the information on a receiver address and duration. In this case, the receiver address of the CTS frame may be set identically to a transmitter address of the RTS frame corresponding thereto, that is, an address of the transmitting terminal STA1.

The transmitting terminal STA1 that receives the CTS frame transmits the data after a SIFS time. When the data transmission is completed, the receiving terminal AP transmits an acknowledgment (ACK) frame after a SIFS time to notify that the data transmission is completed. When the transmitting terminal receives the ACK frame within a predetermined time, the transmitting terminal regards that the data transmission is successful. However, when the transmitting terminal does not receive the ACK frame within the predetermined time, the transmitting terminal regards that the data transmission is failed. Meanwhile, adjacent terminals that receive at least one of the RTS frame and the CTS frame in the course of the transmission procedure set a network allocation vector (NAV) and do not perform data transmission until the set NAV is terminated. In this case, the NAV of each terminal may be set based on a duration field of the received RTS frame or CTS frame.

In the course of the aforementioned data transmission procedure, when the RTS frame or CTS frame of the terminals is not normally transferred to a target terminal (i.e., a terminal of the receiver address) due to a situation such as interference or a collision, a subsequent process is suspended. The transmitting terminal STA1 that transmitted the RTS frame regards that the data transmission is unavailable and participates in a next contention by being allocated with a new random number. In this case, the newly allocated random number may be determined within a range (2*CW) twice larger than a previous predetermined random number range (a contention window, CW).

In the exemplary embodiments given below, a case where a first terminal transmits an RTS frame to a second terminal may be construed as a meaning that the first terminal transmits the RTS frame in which a transmitter address is an address of the first terminal and a receiver address is an address of the second terminal unless otherwise stated. Further, a case where the first terminal transmits a CTS frame to the second terminal may be construed as a meaning that the first terminal transmits the CTS frame in which a receiver address is an address of the second terminal unless otherwise stated.

On the other hand, the aforementioned contention-based data transmission methods can operate well in an environment with less users, but the communication performance is drastically deteriorated in an environment where there are many users to transmit packets. Therefore, a method in which a plurality of terminals efficiently transmit and receive data in a dense user environment is required. Hereinafter, methods for transmitting and receiving data according to embodiments of the present invention will be described with reference to each drawing. In the embodiments of the drawings, duplicative description of parts which are the same as or correspond to the embodiments of the previous drawings will be omitted.

Figure 8:
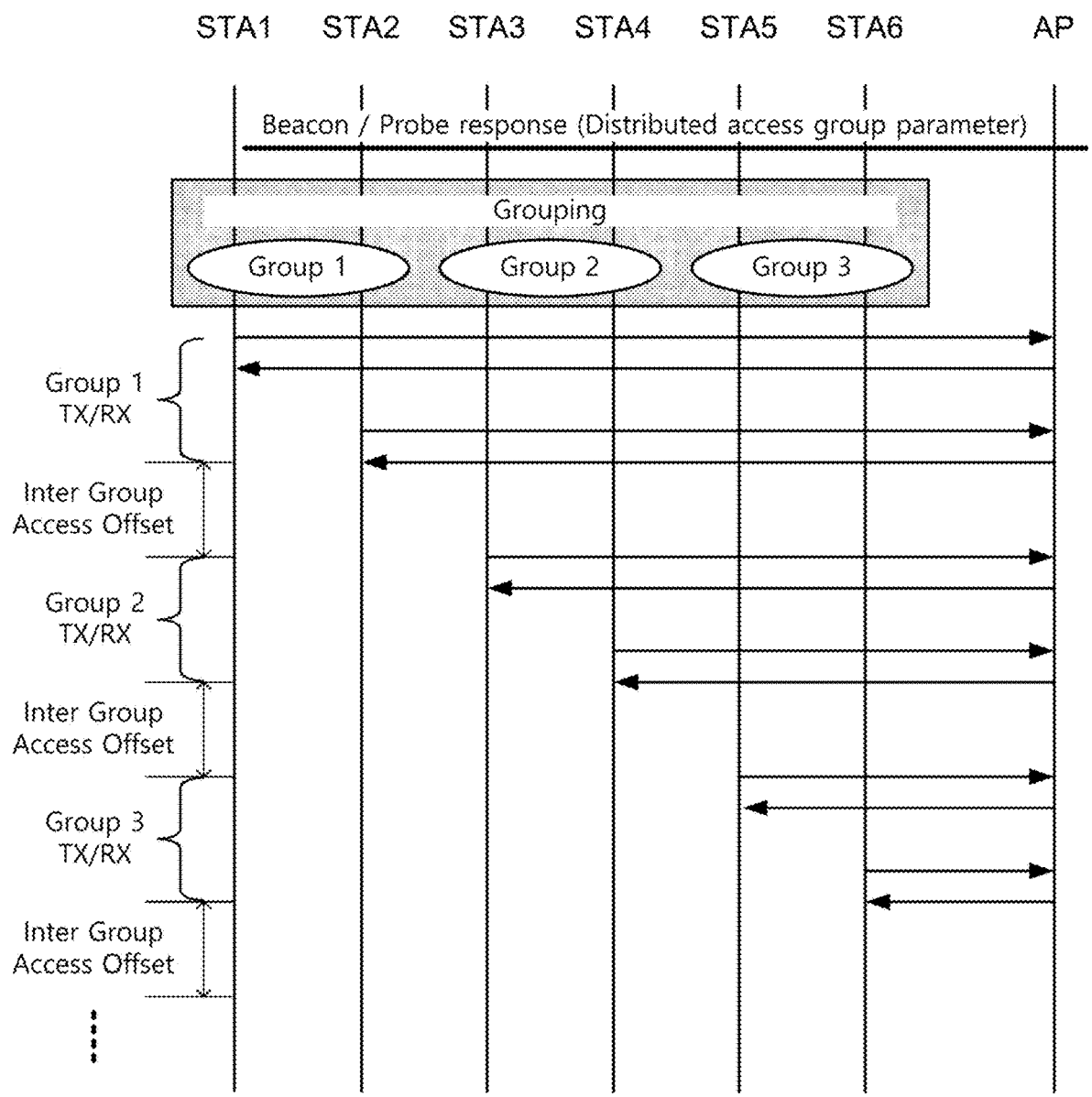
FIGS. 8 to 10 illustrate a wireless communication method for a terminal using a distributed access group.
Figure 9:
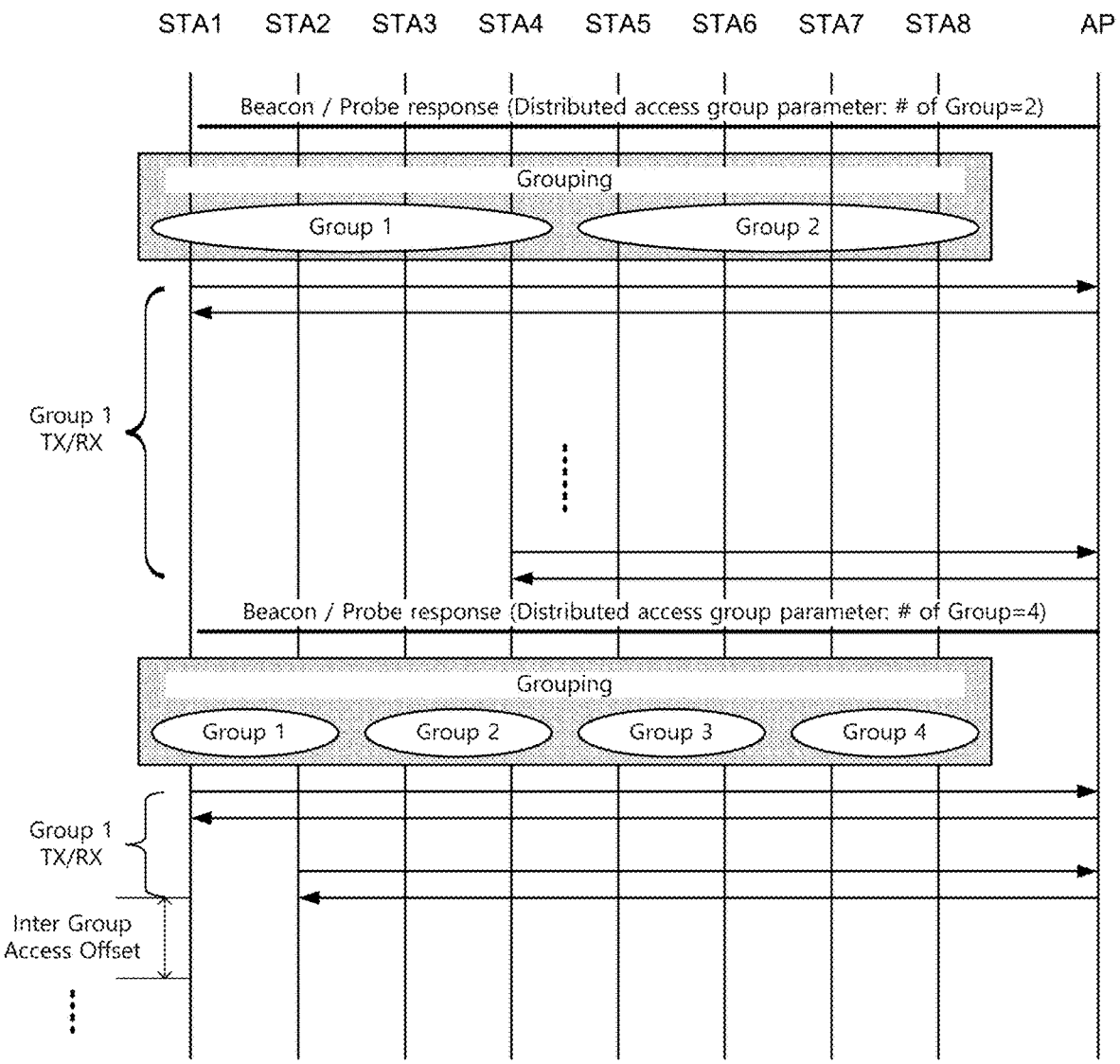
Figure 10:
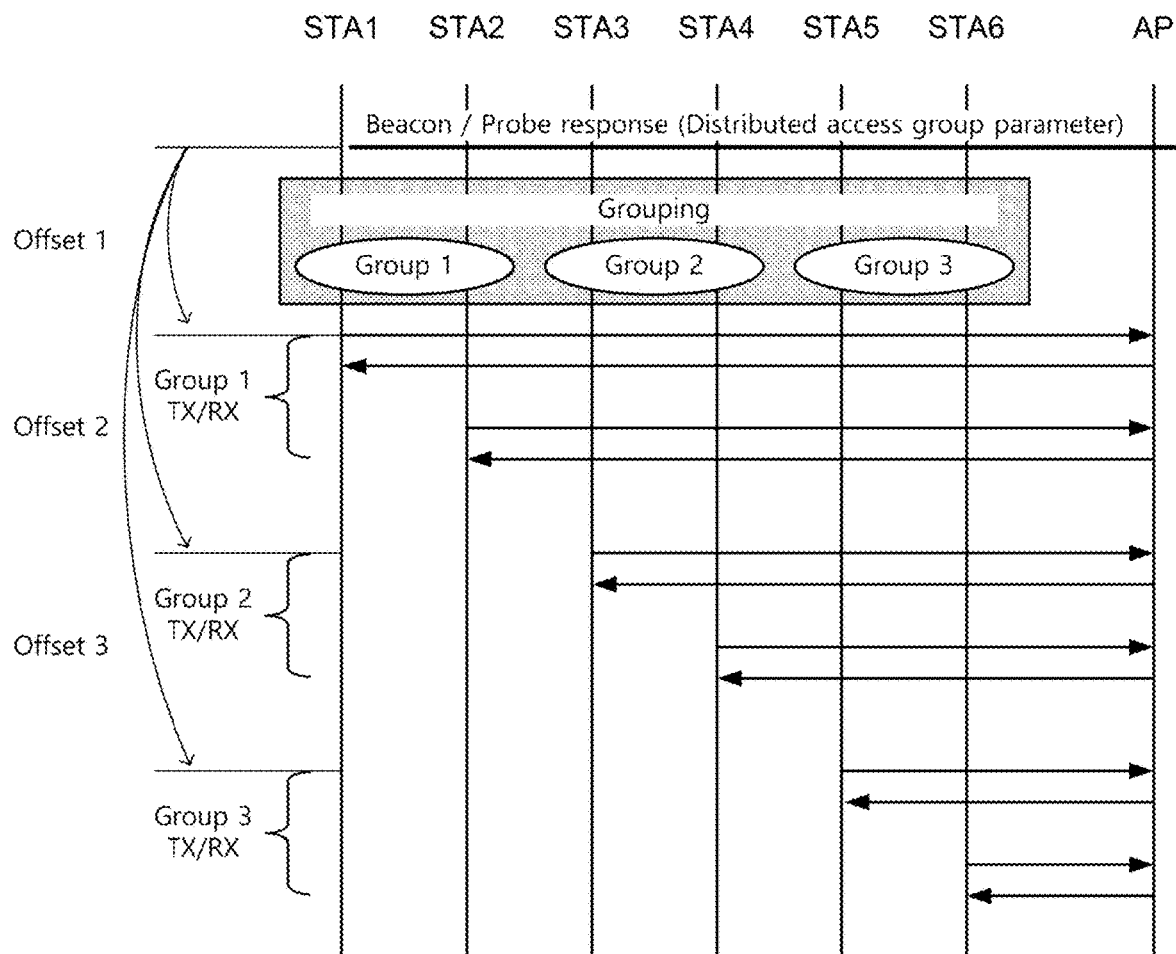

FIGS. 8 to 10 illustrate a wireless communication method for a terminal using a distributed access group according to an embodiment of the present invention. According to an embodiment of the present invention, the plurality of terminals in a BSS are grouped into at least one group and data transmissions for terminals may be performed by an allocated group unit.

For the data transmission/reception by a group unit, the AP transmits a distributed access group parameter. The terminals in the BSS having received the distributed access group parameter from the AP start distributed accesses by the group unit. The distributed access group parameter triggering a distributed access by the group unit may be transmitted based on an access delay threshold value. When a time taken for the terminals in the BSS to perform CSMA/CA contention in order to transmit packets is longer than the access delay threshold value, the AP may transmit the distributed access group parameter. For example, when a contention window value allocated to the AP or the terminal in the BSS is longer than the distributed access threshold value, the AP may transmit the distributed access group parameter. As another embodiment, the AP may obtain information about the number of packet collisions per unit time and when the number of packet collisions is greater than a predetermined reference value, the AP may transmit the distributed access group parameter.

The distributed access group parameter may be included in a control message such as a beacon, a probe response, or an association response. According to another embodiment, the AP may transmit the distributed access group parameter through a separate trigger frame. The distributed access group parameter is a parameter that is referred to by terminals performing distributed accesses by a group unit, and includes information such as the number of groups assigned to the corresponding BSS, and an inter-group access offset. At this point, information about terminals included in each group is designated through the distributed access group parameter. The AP may directly designate the terminals belonging to each group and transmit the designation information as the distributed access group parameter. According to another embodiment, the terminal may obtain group information to be allocated to the corresponding terminal, namely, a group number by using the distributed access group parameter received from the AP.

The group number of the terminal may be determined based on identifier information (or address information) of the corresponding terminal and information of the number of groups. According to an embodiment, the group number of the terminal may be determined based on a result value obtained by modulo-operating the identifier information of the corresponding terminal with the information of the number of groups according to the following equation.

$$\text{group number of terminal} = \text{mod}(\text{identifier information of terminal, the number of groups}) + 1 \quad \text{[Equation 1]}$$

At this point, a MAC address or an association identification (AID) information of the terminal, etc. may be used as the identifier information of the terminal. For example, when a MAC address of 48 bits is used as the identifier information of the terminal, a MAC address of 3C-A9-F4-69-43-A4 is represented as a binary number of 0011 1100 1010 1001 1111 0100 0110 1001 0100 0011 1010 0100. When the number of groups is 5 and the MAC address is modulo-operated with 5, 4 is obtained as a result value. At this point, 4, which is the result value of the modulo-operation, is allocated as the group number of the corresponding terminal, or a value (namely, 5) obtained by adding 1 to the result value of the modulo-operation as shown in Equation 1 may be allocated as the group number of the corresponding terminal.

In this way, when a plurality of terminals are classified into at least one group, each terminal performs data transmission/reception by each allocated group unit. According to an embodiment of the present invention, during an access period of each group, only designated terminals in a corresponding group may participate in data transmission/reception. At this point, each terminal in an identical group may sequentially transmit/receive data or simultaneously transmit/receive data using different channels (frequency bands) with each other. When each terminal sequentially transmits/receives data, each terminal may transmit uplink data by using the above-described CSMA/CA method during the access period of the corresponding group. In addition, when each terminal simultaneously transmits/receives data using different channels, each terminal may transmit uplink data using Orthogonal Frequency Domain Multiple Access (OFDMA).

According to an embodiment of the present invention, an access period of each group may be continued until the channel is idle for an inter-group access offset time. In other words, when the channel is idle for a predetermined inter-group access offset time, an access period of a previous group is switched to an access period of a next group. Meanwhile, according to another embodiment, an access period of each group may be set as a fixed time value, or as a time value varying based on information of the number of designated terminals in the group, etc.

FIG. 8 illustrates an embodiment of a wireless communication method for a terminal using a distributed access group. In the embodiment of FIG. 8, the number of STAs for data transmission is set to 6 and the number of groups is set to 3. In addition, based on the above-described group number determination method, it is assumed that STA1 and STA2 are grouped into group 1, STA3 and STA4 are grouped into group 2, and STA5 and STA6 are grouped into group 3, respectively. Each terminal performs data transmission and reception according to an access order allocated for each group. In the embodiment of FIG. 8, the access order is allocated in the order of group 1, group 2 and group 3, and terminals of group 1 attempt access first.

STA1 and STA2 included in group 1 transmit uplink data using the above-described CSMA/CA or OFDMA during an access period of group 1. According to an embodiment of the present invention, the uplink data transmission by non-AP STAs belonging to the corresponding group may be limited to a predetermined number of times (e.g. once), respectively. At this point, each non-AP STA may sequentially transmit uplink data during the access period or may simultaneously transmit the uplink data using different channels (frequency bands) with each other. However, the AP may transmit downlink data even in an access period of any group and may transmit the downlink data without limitation to the number of times even in an access period allocated to a specific group.

When data transmission by terminals of a previous group (group 1) is completed, no further data transmission is performed and a channel becomes idle. Each terminal in the BSS performs CCA to check whether a channel is busy and an access period of a next access order group (group 2) starts when the channel is maintained in an idle state for an inter-group access offset time. In other words, when the channel is idle for the inter-group access offset time, terminals of the next group (group 2) may regard that the access period of the previous group (group 1) is terminated and attempt to transmit data right after the corresponding offset time. According to an embodiment of the present invention, the inter-group access offset may be set larger than a value of AIFS for performing a typical backoff procedure. According to an embodiment, the inter-group access offset may be set to a value of twice or three times the AIFS. According to another embodiment, the inter-group access offset may be set to a value of DIFS+a*CWmax. Here, CWmax is a maximum value of a contention window and 'a' is a constant of 1 or less. The constant 'a' may be changed within a predetermined range according to channel availability. Each terminal in the BSS may identify that a group performing data transmission/reception is switched, when the inter-group access offset occurs (namely, when a channel is idle for the inter-group access offset time).

On the other hand, when the inter-group access offset time is set to be short (e.g. AIFS, etc.), data transmission by a terminal belonging to a previous group (group 1) may not be completed until the access period of the corresponding group (group 1) is terminated. At this point, the corresponding terminal may participate in contention for uplink data transmission in an access period of a next group (group 2). In other words, a terminal, which starts to perform a backoff procedure in the group access period allocated to each terminal, continues to perform the backoff procedure to attempt data transmission regardless of the access period for each group, until the data transmission is completed.

In the embodiment of FIG. 8, when the access period of group 2 is terminated, an access period of group 3 begins after an inter-group access offset time in the same method. Data transmission/reception by a group unit may be performed once for each group, or may be repeated a plurality of times. When the data transmission/reception by a group unit is repeated the plurality of times and when an access period of the last group (group 3) is completed, the access period of the first group (group 1) may be resumed. At this point, the repetition number information for data transmission/reception by a group unit may be included in a distributed access group parameter.

FIG. 9 illustrates another embodiment of a wireless communication method for a terminal using a distributed access group. According to the other embodiment of the present invention, at least one piece of information of the distributed access group parameter may be changed during data transmission/reception by a group unit. According to the embodiment of FIG. 9, the information of the number of groups of the distributed access group parameter may be changed. The AP may set an initial value of the number of groups according to a predetermined rule and change the number of groups according to a status of data transmission/reception by a group unit.

Referring to FIG. 9, the AP transmits a distributed access group parameter by setting the initial value of the number of groups to 2. Accordingly, terminals in the BSS are classified into two groups according to the aforementioned embodiment and the terminals of group 1 first attempt an access according to an access order allocated for each group. However, when a large number of terminals are allocated to one group, a time taken for all the terminals of the corresponding group to complete data transmission becomes longer and it is highly possible that collisions will occur between the terminals during the access period of the corresponding group. Accordingly, the AP may increase the number of groups used for distributed access by a group unit to reduce the number of terminals participating in contention in a same time period (namely, the access period).

According to an embodiment, the AP may change the number of groups based on duration of an access period of an individual group. In other words, the AP may increase the number of groups in the case where a time taken from when terminals of the corresponding group start contention for data transmission to when the inter-group access offset occurs becomes longer than a predetermined maximum contention time threshold value. When the number of groups increases, the updated number of groups may be increased by 1 from the previous number of groups or twice the previous number of groups. However, the present invention is not limited thereto. The AP transmits information of the updated number of groups through the distributed access group parameter and each terminal which has received the distributed access group parameter newly obtains a group number of the corresponding terminal based on information of the updated number of groups. According to the embodiment of FIG. 9, the AP increases the number of groups from the initial value 2 to 4, and transmits the distributed access group parameter including the information of the updated number of groups to each terminal in the BSS through a beacon or a probe response. Each terminal changes a group number thereof and resumes data transmission/reception by a group unit based on the information of the update number of groups and the changed group number.

On the contrary, the AP may decrease the number of groups in the case where a time (namely, an access time of an individual group) taken from when terminals of the corresponding group start contention for data transmission to when the inter-group access offset occurs becomes shorter than a predetermined minimum contention time threshold value. When the number of groups decreases, the updated number of groups may be decreased by 1 from the previous number of groups or by ½ of the previous number of groups. However, the present invention is not limited thereto. Accordingly, the AP may prevent the number of occurrences of the inter-group access offset from being increased and a channel use efficiency from being lowered due to an excessive number of groups which exceeds the number of total terminals.

FIG. 10 illustrates another embodiment of a wireless communication method for a terminal using a distributed access group. According to the embodiment of FIG. 10, the distributed access group parameter may further include access start offset information of each group. The access start offset information represents a time after transmission of the distributed access group parameter until terminals of the corresponding group start accesses. Each terminal may obtain a group number of the corresponding terminal and access start offset information corresponding thereto, and start uplink data transmission after an access start offset time of the corresponding terminal has elapsed from the time triggered by the distributed access group parameter.

Referring to FIG. 10, the number of groups is set to 3, terminals of group 1, group 2, and group 3 start data transmission after a time of first transmission start offset (Offset 1), a second transmission start offset (Offset 2), and a third transmission start offset (Offset 3) respectively pass. According to an embodiment, a transmission start offset of each group may be set in uniform intervals or may be set in different intervals according to the number of terminals allocated to each group, etc. When the transmission start offset of each group is set in uniform intervals, in other words, when an access time allocated to each group is identical, the distributed access group parameter may include group access time information T_gr. Each terminal having obtained the group access time information T_gr may calculate transmission start offset information of a group to which the corresponding terminal belongs by using a group number of the corresponding terminal and the group access time information T_gr. For example, in the embodiment of FIG. 10, a transmission start offset of group 3 may be determined to 2*T_gr+Offset 1. Here, Offset 1 represents a time from a time point triggered by the distributed access group parameter to the start of an access period of a first group (group 1).

As described above, although data transmission by a terminal of a previous group is not completed, a transmission start offset time of a next group may arrive and data transmission by terminals of the next group may start. At this point, the terminal of the previous group, in which the data transmission has not been completed, may participate in contention for data transmission even in an access period of the next group.

Figure 11:
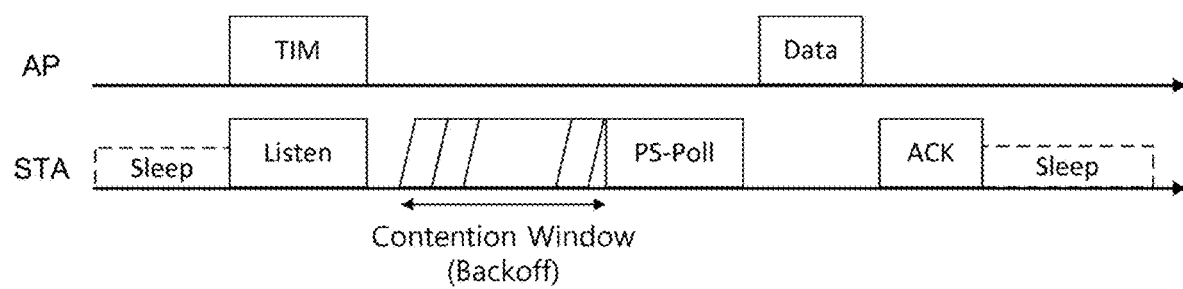
FIG. 11 illustrates a data transmission method using a TIM and a PS-Poll in a power saving mode.

FIG. 11 illustrates a data transmission method using a TIM and PS-Poll in a power saving mode as another embodiment of the present invention. Wireless LAN terminals may be switched into a power save (PS) mode for efficient power management. In the PS mode, each terminal (STA) receives a traffic indicator map (TIM) that is periodically transmitted by the AP, and checks whether there is data to be received by the corresponding terminal. When the TIM indicates that there is data to be received by the corresponding terminal, the terminal transmits a PS-Poll to indicate that data reception is possible. At this point, the terminal transmits the PS-Poll by using the above-described CSMA/CA method. In other words, each terminal for transmitting the PS-Poll performs a backoff procedure in a contention window period. A terminal in which a backoff counter has expired transmits the PS-Poll and the AP having received the PS-Poll transmits data to the corresponding terminal. After completing data reception, the terminal transmits an acknowledgement (ACK) frame and switches to a sleep state.

Figure 12:
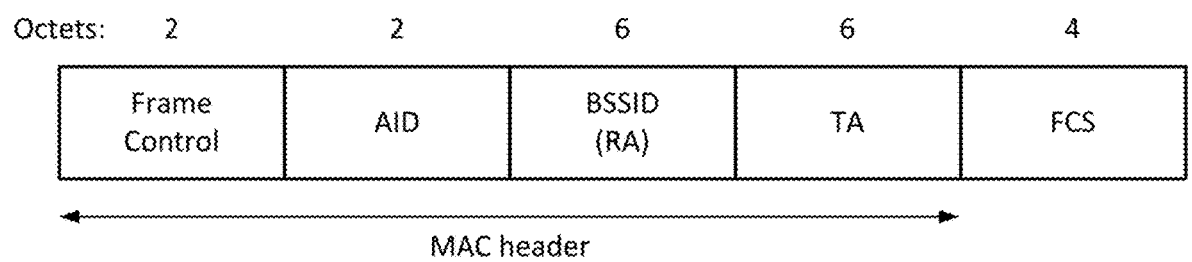
FIG. 12 illustrates an embodiment of a data request frame for distributed data transmission using multi-channels.

FIG. 12 illustrates a frame structure of a PS-Poll. The PS-poll transmitted by a terminal includes an association ID (AID), a BSS identifier (BSSID), and a transmitter address (TA) of the corresponding terminal. The AID may be received from the AP in an association procedure of a terminal and according to an embodiment, may have a maximum value of 2007. The BSSID indicates a MAC address of the AP with which the corresponding terminal is associated and is used as a receiver address (RA) of the PS-Poll. The transmitter address indicates a MAC address of a terminal that transmits the PS-Poll.

According to an embodiment of the present invention, data transmission for multi-users may be performed using the TIM and PS-Poll. In more detail, according to an embodiment of the present invention, efficient data transmissions/receptions by a plurality of terminals may be performed through distributed data transmission using multi-channels and at this point, the TIM and PS-Poll may be used. Embodiments hereinafter may be performed in PS modes of terminals, but the present invention is not limited thereto and may also be performed in another normal mode of the terminals. When the present invention is performed in a normal mode of terminals, in embodiments below, a TIM, a PS-Poll, and a PS polling period may be respectively replaced with a trigger frame, a data request frame, and a data request frame transmission period.

Figure 13:
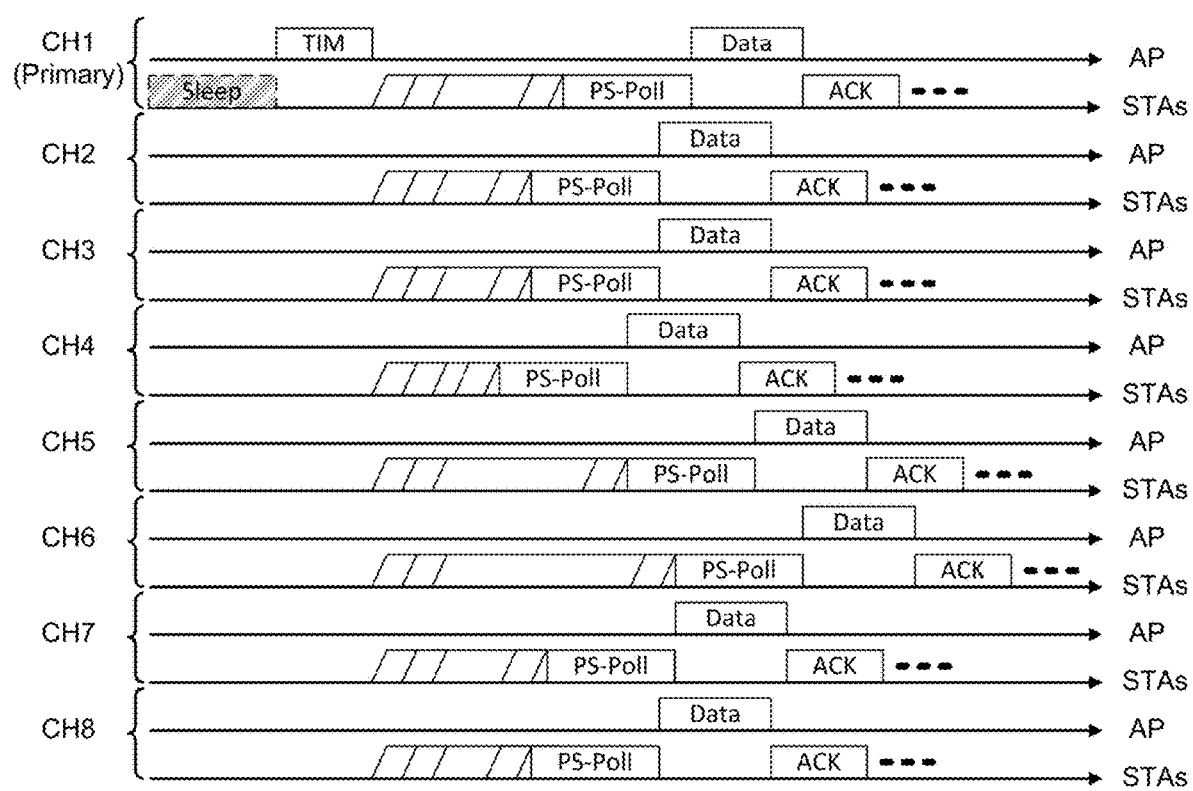
FIGS. 13 to 18 illustrate distributed data transmission methods using multi-channels according to a first embodiment of the present invention.

FIG. 13 illustrates an embodiment of a distributed data transmission method using multi-channels. Referring to FIG. 13, terminals in a PS mode wake up at a time when the TIM is transmitted and receive the TIM. In an embodiment of the present invention, the TIM represents a trigger frame for indicating downlink data to be transmitted to each terminal through multi-channels and such a trigger frame may be implemented in a type of frame other than the TIM according to an embodiment. When the TIM indicates that there is data to be transmitted to the corresponding terminal, the terminal transmits a PS-Poll indicating presence of the corresponding terminal in order to receive the data. Meanwhile, a terminal performs contention through a backoff procedure in order to transmit the PS-Poll. When numerous terminals participate in the contention, it is highly possible that collisions occur and contention may be continued for a long time until successful transmission of the PS-Poll.

Therefore, according to an embodiment of the present invention, PS-Polls of a plurality of terminals may be transmitted using multi-channels. In an embodiment of the present invention, the PS-Poll represents a data request frame corresponding to the trigger frame and such a data request frame may be implemented in a type of frame (e.g. PS-Poll' to be described later) other than the PS-Poll.

According to an embodiment, a target channel through which each terminal will transmit the PS-Poll may be determined based on an identifier and information of the number of available channels of the corresponding terminal. The terminal may obtain channel information operated by the AP with reference to channel width information delivered through a beacon frame. At this point, all or a part of the channels operated by the AP may be designated as available channels. Terminals indicated as having data to be received by the TIM may determine the target channels for transmitting the PS-Poll based on the channel information. In detail, the target channel for transmitting the PS-Poll may be determined based on a value obtained by module-operating the identifier information of the corresponding terminal with the number of available channels. At this point, a MAC address, AID information of the terminal, or the like may be used as the identifier information of the corresponding terminal. When the available channels are consecutively disposed, a channel number of the target channel through which the PS-Poll is to be transmitted may be determined as a value obtained by adding a channel number of a first channel among the available channels to the obtained value of the modulo operation.

According to another embodiment, a target channel through which each terminal transmits the PS-Poll may be determined based on an order that the corresponding terminal is indicated in the received TIM. A partial virtual bitmap of the TIM indicates whether there is data to be delivered to each terminal in the BSS. If there is data to be transmitted to a specific terminal, the corresponding terminal may be indicated with 1. On the other hand, if there is no data to be transmitted, the corresponding terminal may be indicated with 0. At this point, the target channel through which each terminal transmits the PS-Poll may be determined in a round robin manner based on an order of terminals indicated that there is data to be delivered on the partial virtual bitmap. In other words, on the partial virtual bitmap, CH1 (primary channel) may be allocated to a terminal indicated with a first 1, and CH2 may be allocated to a terminal indicated with a second 1. In addition, when the number of available channels is eight as in the embodiment of FIG. 13, CH2 may be allocated to a terminal indicated with a tenth 1 on the partial virtual bitmap. Such a channel allocation method is to determine channel allocation based on a result value obtained by modulo-operating an indicated order of the corresponding terminal on the partial virtual bitmap with the number of available channels. At this point, a channel number of a target channel through which the PS-Poll is to be transmitted may be determined as a value obtained by adding a channel number of a first channel among the available channels to the modulo-operation result value and subtracting 1 from the added value.

In this way, when the target channel through which each terminal transmits the PS-Poll is determined, the terminal performs a backoff procedure in the determined target channel in order to transmit the PS-Poll. A terminal in which a backoff counter has expired in the backoff procedure transmits the PS-Poll through the target channel. When the PS-Poll is successfully transmitted, the AP transmits downlink data to the terminal having transmitted the PS-Poll through the corresponding channel. The terminal transmits a response message after receiving the downlink data. The above-described operations may be continued until all terminals allocated to each channel transmit the PS-Poll and receive data. At this point, a series of processes in which the PS-Poll, data and response message are transmitted may be independently performed for each channel of the multi-channels. In this way, collision possibilities among terminals may be lowered by distributing channels through which each terminal in the BSS transmits the PS-Poll and receives data. Meanwhile, the indication of an interframe space (IFS) between each transmission procedure is omitted in FIG. 13, but a predetermined waiting time such as AIFS or SIFS, etc. may be set between each transmission procedure.

Figure 14:
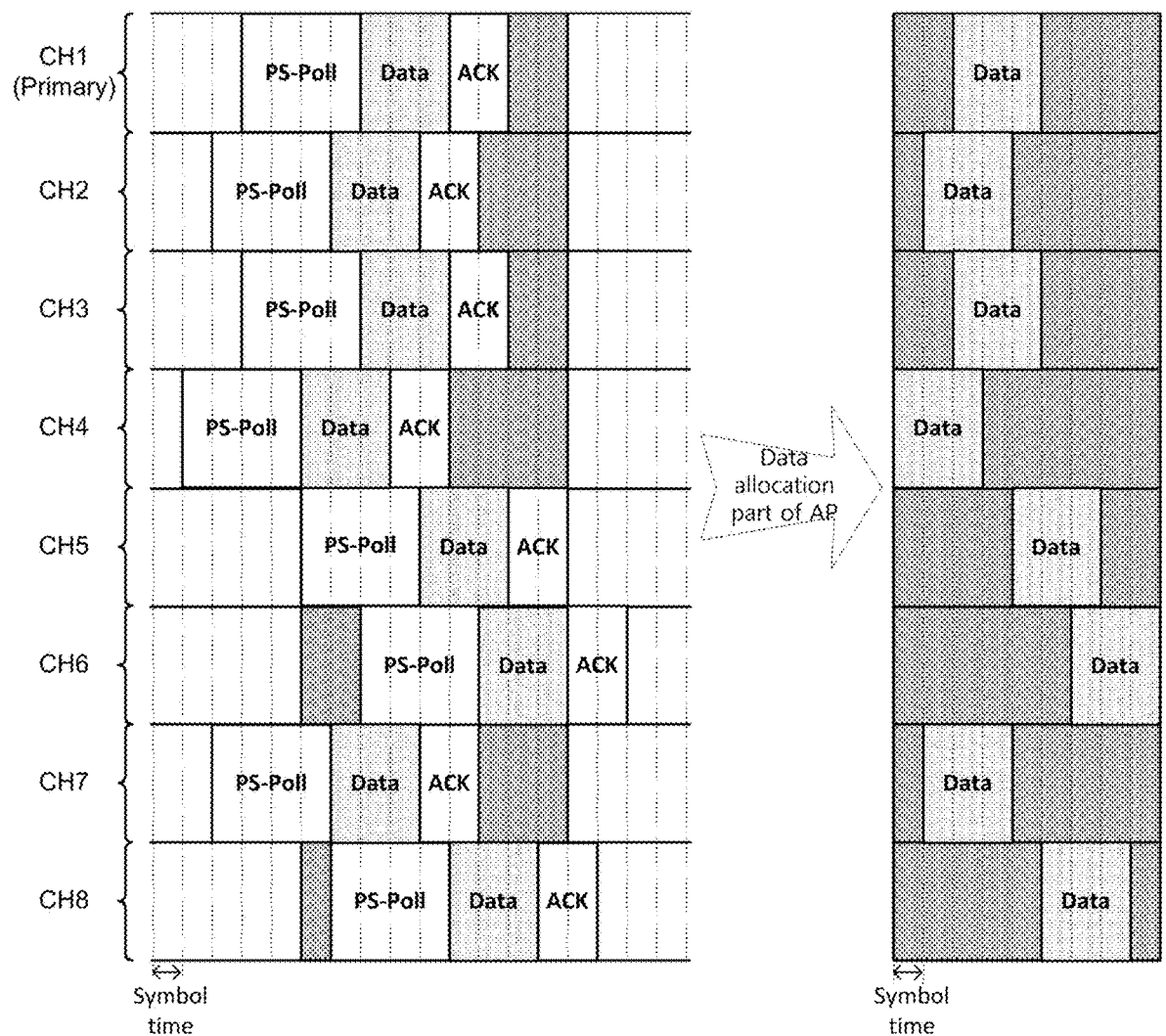

FIG. 14 illustrates a resource allocation method of the AP at the time of data transmission according to the embodiment of FIG. 13. According to an embodiment of the present invention, the AP may transmit data to each terminal by using OFDMA. A portion shadowed in FIG. 14 indicates a period in which the AP transmits data and the AP uses available channels to simultaneously transmit data to each terminal by an OFDM symbol unit. Each terminal receives the data through the target channel allocated to the corresponding terminal among multi-channels.

Figure 15:
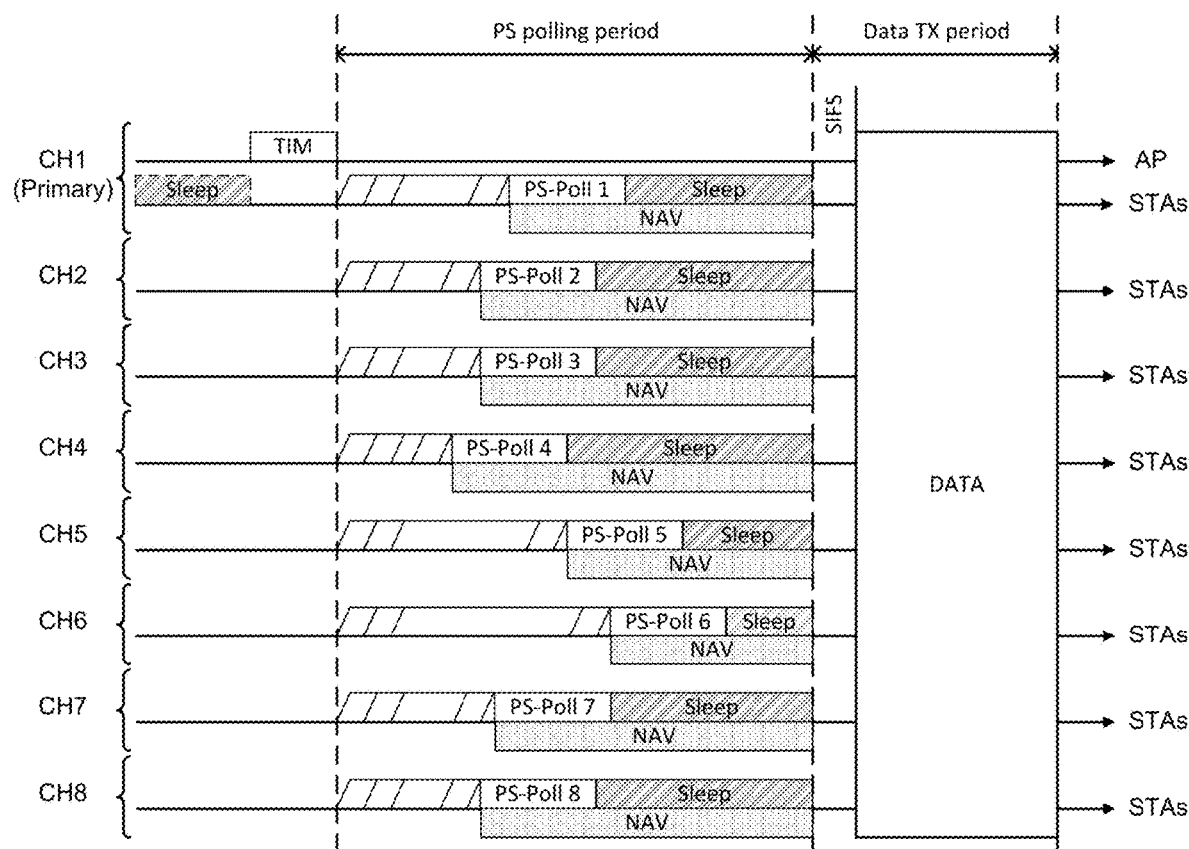

FIG. 15 illustrates another embodiment of a distributed data transmission method using multi-channels. When there is a large amount of data to be transmitted, it is efficient to transmit the data by an aggregate MAC protocol data unit (A-MPDU). To this end, according to the embodiment of FIG. 15, a PS polling period and a data transmission period are separately allocated to perform distributed data transmission. The PS polling period is a period in which the PS-Poll of each terminal is transmitted and each terminal is allocated with a target channel and performs a backoff contention in the allocated target channel to transmit the PS-Poll. In addition, the data transmission period is a period in which downlink data is transmitted to terminals succeeding in PS-Poll transmission.

Duration information of the PS polling period and data transmission period may be transmitted through a beacon, etc. or pre-designated time values may be used for them. According to an embodiment of FIG. 15, the PS polling period may be determined to be a time in which one terminal for each channel may transmit the PS-Poll, for example, AIFS+minimum contention window value (CWmin)+transmission time of PS-Poll. A terminal which succeeds in contention to transmit the PS-Poll may switch to a sleep state during a remaining PS polling period to save power. On the other hand, in the PS-Poll transmitted by the terminal, a duration field indicating a time until the end of the PS polling period may be set. According to an embodiment, for simultaneous termination of the PS polling periods, the duration field value of the PS-Poll may be determined based on a result obtained by subtracting a backoff counter value used for transmitting the corresponding PS-Poll from an initially set duration value of the PS polling period. Other terminals having received the PS-Poll set a network allocation vector (NAV) based on the duration field value of PS-Poll. In other words, the other terminals having received the PS-Poll do not perform data transmission during a time when the PS-Poll is being transmitted and the remaining PS polling period. Accordingly, the terminal having transmitted the PS-Poll may receive data from the AP right after the PS polling period is terminated and the data transmission period is started.

When the PS polling period is terminated, data transmission may be started after a SIFS time. During the data transmission period, the AP transmits downlink data to the terminals having transmitted the PS-Poll in the PS polling period. At this point, the AP may simultaneously transmit the data to a plurality of terminals through multi-channels. According to an embodiment, the AP may transmit A-MPDU into which data for a plurality of terminals is aggregated during the data transmission period. On the other hand, between the PS polling period and the data transmission period, a waiting time other than SIFS, for example, an AIFS may be set.

According to an embodiment of the present invention, the PS polling period and data transmission period may be repeated a plurality of times. At this point, information on the number of the repetition is included in the TIM to be delivered to each terminal. Terminals having failed in PS-Poll transmission in a previous PS polling period may perform a backoff procedure in order to transmit the PS-poll again in a new PS polling period. At this point, each terminal uses a backoff counter remaining in the previous polling period or is allocated with a new backoff counter to perform the backoff procedure. According to another embodiment of the present invention, the number of the repetition may not be separately set and the PS polling period and data transmission period may be repeated until all terminals indicated in the TIM receive data.

Figure 16:
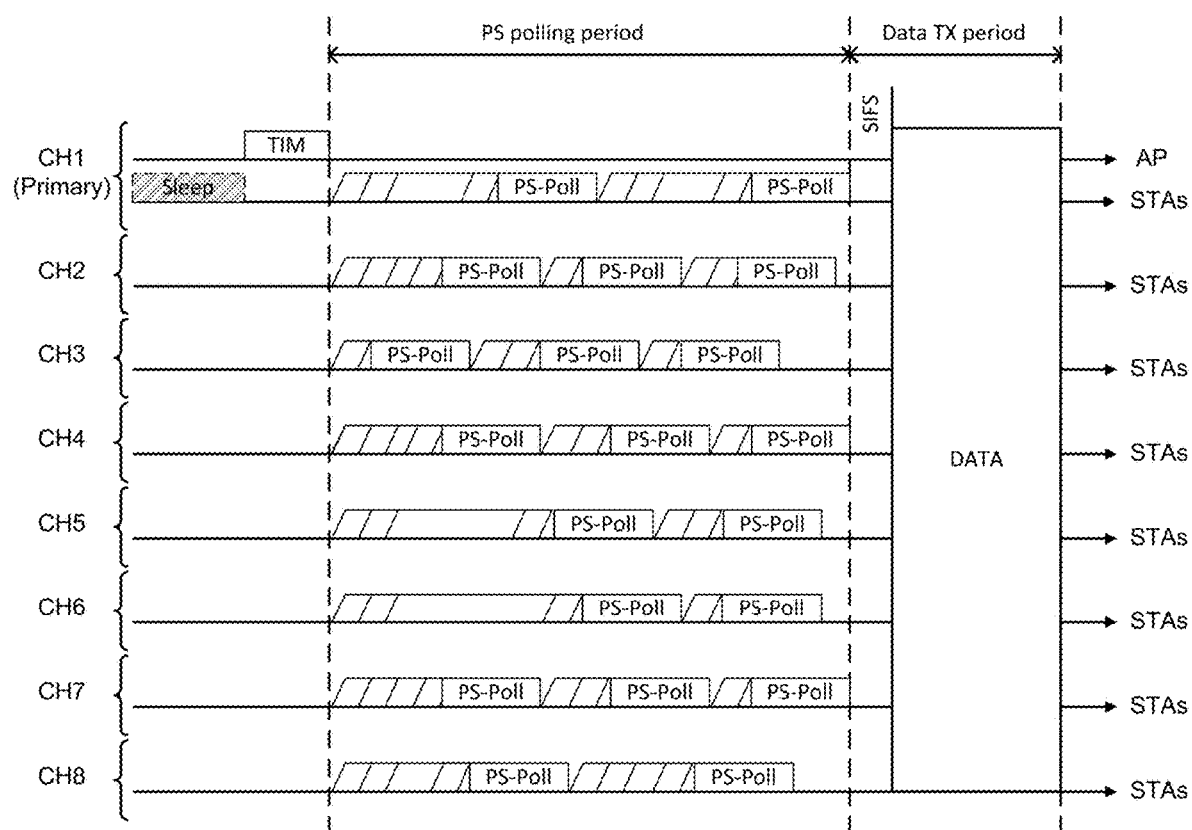

FIG. 16 illustrates another embodiment of a distributed data transmission method using multi-channels. According to the embodiment of FIG. 16, a plurality of terminals may transmit a PS-Poll for each channel during a PS polling period. At this point, the PS polling period may be determined to be sufficiently long such that the plurality of terminals can transmit the PS-Poll in an identical channel, and each terminal performs backoff contention in a target channel allocated to the corresponding terminal to transmit the PS-Poll. In other words, when the number of terminals which will transmit the PS-Poll through the target channel is plural, a first terminal whose backoff counter expires first transmits the PS-Poll and the remaining terminals wait. When the PS-Poll transmission by the first terminal is completed, the remaining terminals except the first terminal resume the backoff procedure and a second terminal whose backoff counter expires first in the resumed backoff procedure may transmit the PS-Poll. Terminals which have successfully transmitted the PS-Poll in the PS polling period may switch to a sleep state during the remaining PS polling period to save power. On the other hand, in the PS-Poll transmitted by the terminal, a duration field indicating a time until the end of the PS polling period may be set. Legacy terminals having received the PS-Poll may set a NAV based on the duration information included in the PS-Poll.

When a predetermined PS polling period is terminated, the AP aggregates data to be transmitted to the corresponding terminals based on PS-Poll packets received during the PS polling period and transmits the aggregated data during the data transmission period. Each terminal having transmitted the PS-Poll during the PS polling period receives the aggregated data during the data transmission period and extracts data of the corresponding terminal from the aggregated data.

Figure 17:
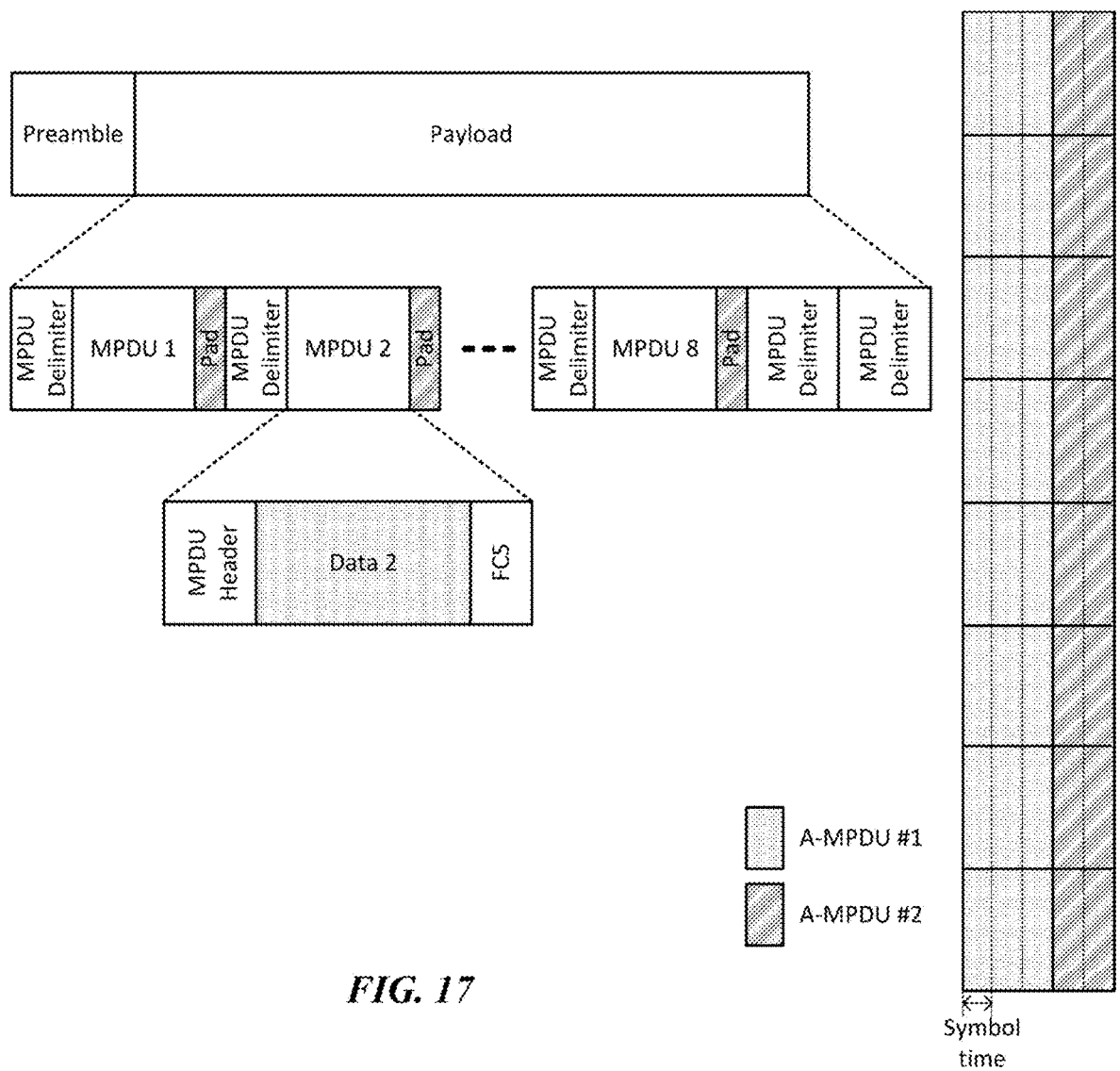

FIG. 17 illustrates an embodiment of a distributed data transmission method using multi-channels. When the terminals that have transmitted the PS-Poll during the PS polling period are identified, the AP may aggregate data to be transmitted to the corresponding terminals to configure A-MPDU (multi-user A-MPDU). In detail, the AP adds an MPDU delimiter and a pad before and after an MPDU for each terminal (MPDU1, MPDU2, . . . ) and aggregates them to configure the multi-user A-MPDU.

According to an additional embodiment of the present invention, the aggregated data (the multi-user A-MPDU) transmitted by the AP may be configured with a plurality of A-MPDUs (A-MPDU #1 and A-MPDU #2). At this point, information of the number of A-MPDUs included in the aggregated data is included in the TIM to be delivered to each terminal. The A-MPDU number including the MPDU for each terminal may be determined based on an order of PS-Poll transmission by the corresponding terminal. In other words, the A-MPDU number including the MPDU of a specific terminal may be determined based on a result value obtained by modulo-operating a PS-Poll transmission order of the corresponding terminal in the PS polling period with the total number of A-MPDUs.

Figure 18:
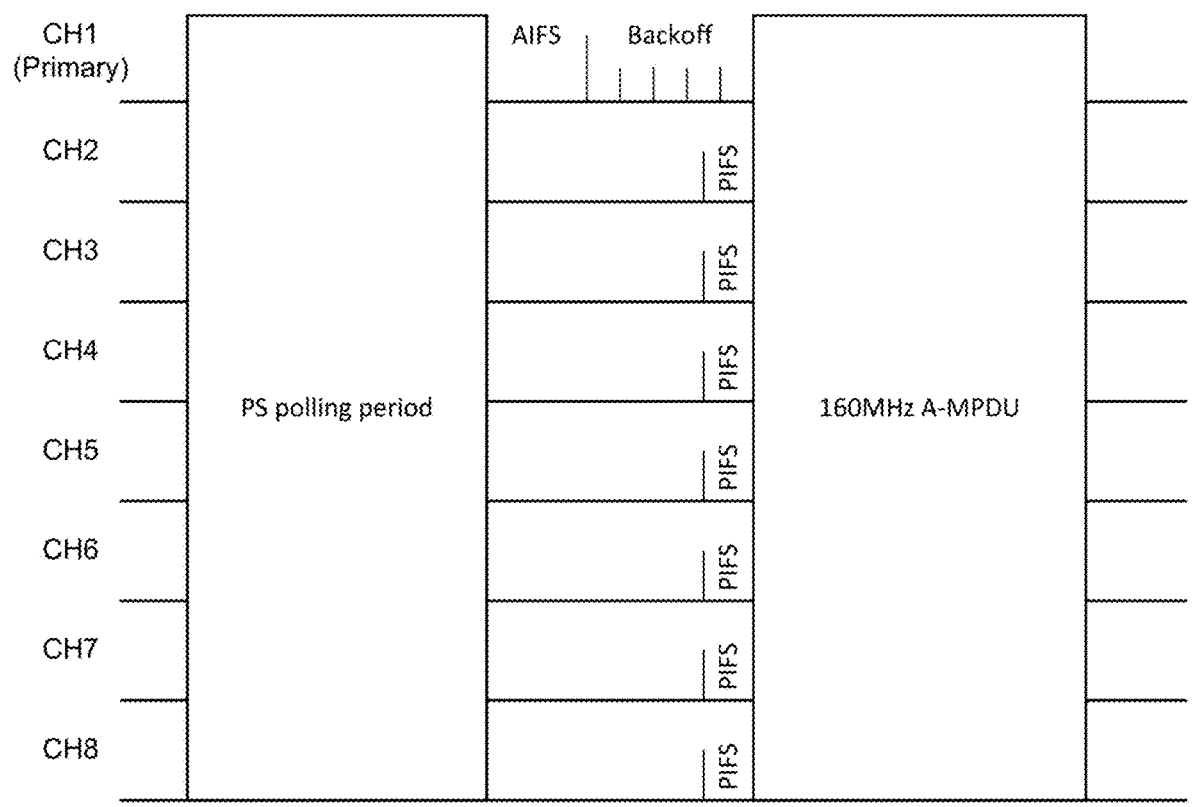

FIG. 18 illustrates another embodiment of a distributed data transmission method using multi-channels. According to an embodiment of FIG. 18, the AP may perform contention for data transmission after the PS polling period is terminated. In other words, the AP performs a backoff procedure for data transmission, and when the backoff counter expires the AP may enter the data transmission period to transmit downlink data. According to an embodiment, the backoff procedure of the AP is performed only on the primary channel CH1 and on other secondary channels CH2 to CH8, CCA may be performed to determine whether the corresponding channels are idle for a PIFS time before the backoff counter expires. When the backoff counter expires, the AP may use together the idle channels that are not occupied by other terminals to transmit the aggregated data (A-MPDU).

Figure 19:
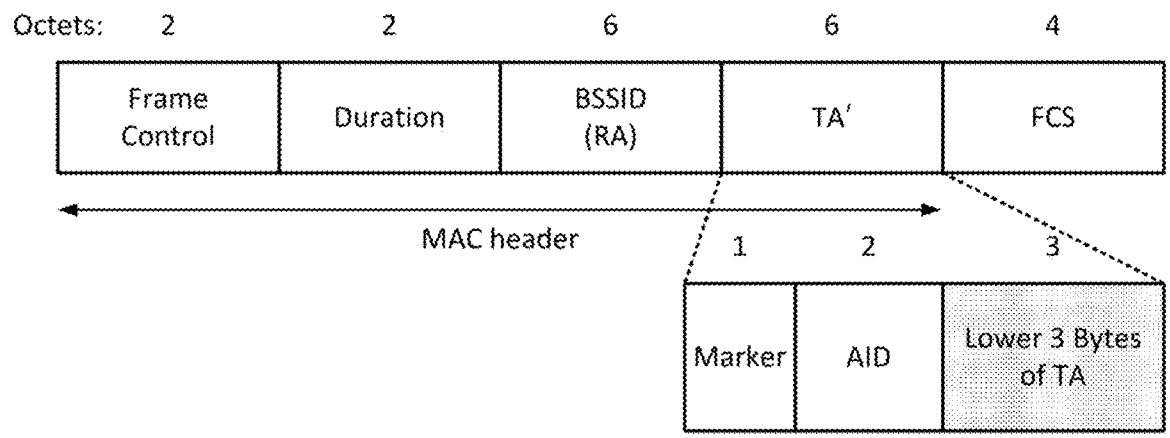
FIG. 19 illustrates another embodiment of a data request frame for distributed data transmission using multi-channels.

FIG. 19 illustrates another embodiment of a data request frame for distributed data transmission using multi-channels. According to the embodiment of FIG. 19, a modified PS-Poll (PS-Poll') may be used as the data request frame.

First, a type and subtype of a frame control field in the PS-Poll' may be set as an RTS. Accordingly, legacy terminals having received the PS-Poll' may set a NAV based on a duration field value thereof. The PS-Poll' may include a duration field, a BSS identifier (BSSID), and a combined transmitter address TA'. The duration field indicates a time until the end of the PS polling period. According to an embodiment, for simultaneous termination of the PS polling period, a duration field value may be determined based on a result obtained by subtracting a backoff counter value used for transmitting the corresponding PS-Poll' from an initially set duration value of the PS polling period. The BSSID indicates a MAC address of the AP with which a terminal having transmitted the corresponding PS-Poll' is associated, and is used as a receiver address (RA) of the PS-Poll'.

Next, the combined transmitter address TA' may include information in which an identifier of a terminal having transmitted the corresponding PS-Poll' and MAC address information of the corresponding terminal are combined. In detail, the TA' may include an AID of the corresponding terminal and partial lower information (e.g. lower 3 bytes) of a MAC address of the corresponding terminal. The upper 3 bytes of the MAC address of the terminal indicate a vendor ID and the lower 3 bytes thereof indicate an ID of a corresponding network interface card. Accordingly, the PS-Poll' may include only the lower 3 bytes of a MAC address used as a TA of an existing PS-Poll in the TA' field, and may use a remaining field of the TA' for indicating AID information. The AP having received the PS-Poll' may identify a terminal that has transmitted the PS-Poll' with reference to the AID information and partial MAC address information of the TA' field in the corresponding PS-Poll'.

According to an additional embodiment, the TA' may further include a marker. The marker is an identifier for identifying the PS-Poll' according to an embodiment of the present invention, and an RTS frame may be distinguished from a PS-Poll' frame based on the marker. In addition, the marker indicates whether a transmitter address field of the corresponding frame represents a combined transmitter address TA' or a normal transmitter address TA. Meanwhile, in the embodiment of FIG. 19, it is illustrated that the TA' is configured with a marker of 1 byte, an AID of 2 bytes, and partial lower information of MAC address of 3 bytes. However this is an embodiment for describing the present invention and the present invention is not limited thereto. For example, the TA' may be configured with AID of 2 bytes and partial lower information of MAC address of 4 bytes.

According to an embodiment of the present invention, data transmission for multi-users may be performed using the PS-Poll'. In other words, efficient distributed data transmission for a plurality of terminals may be performed using a PS-Poll' additionally including a duration field. FIGS. 20 to 25 illustrate detailed embodiments thereof. In the embodiments below, duplicative descriptions of parts, which are the same as or corresponding to the embodiments of FIGS. 13 to 18, will be omitted. In other words, the embodiments for PS-Poll transmission in FIGS. 13 to 18 may be replaced with embodiments for PS-Poll' transmission without separate descriptions.

Figure 20:
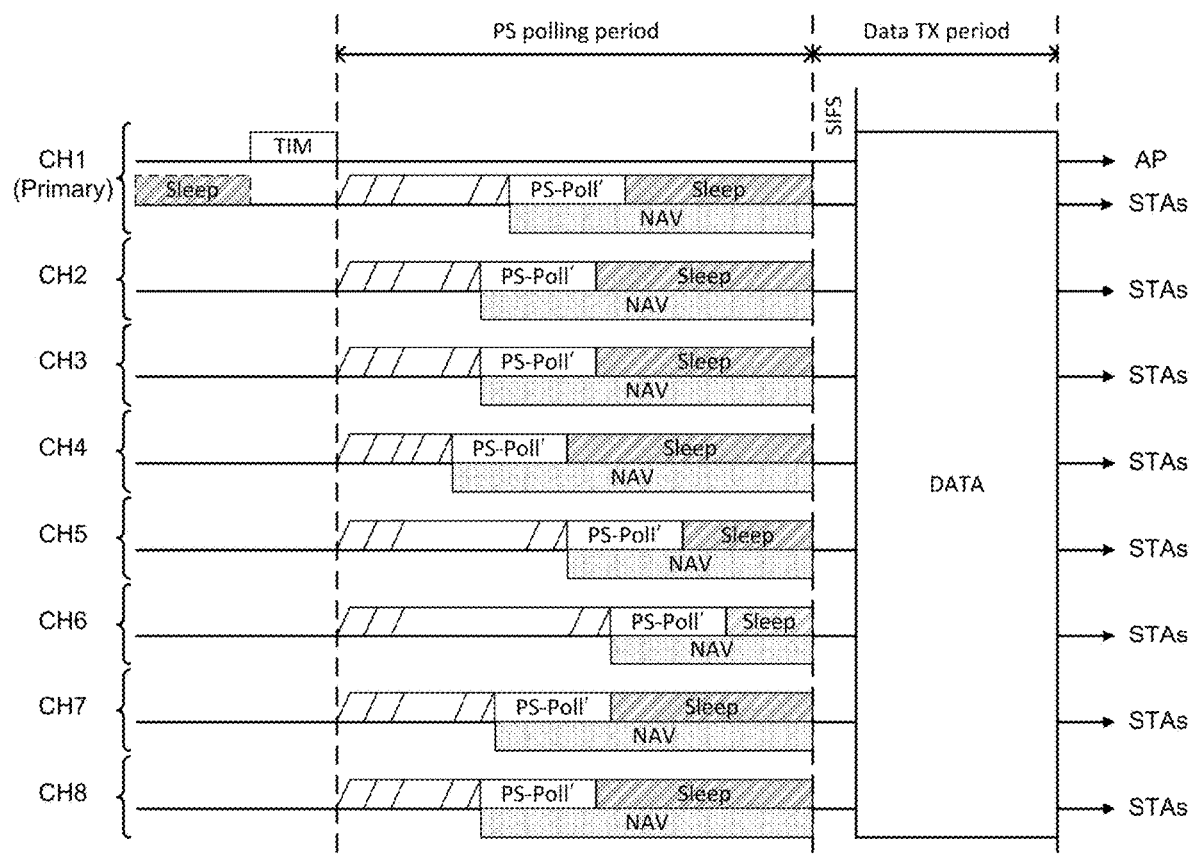
FIGS. 20 to 25 illustrate distributed data transmission methods using multi-channels according to a second embodiment of the present invention.

First, FIG. 20 illustrates an embodiment of a distributed data transmission method using multi-channels. As described above in relation to the embodiment of FIG. 15, the distributed data transmission may be performed through a separately allocated PS polling period and data transmission period. When each terminal transmits PS-Poll' in a PS polling period, other terminals having received the corresponding PS-Poll' set NAVs based on a duration field value of the PS-Poll'. Like the above-described embodiment, the duration field of the PS-Poll' indicates a time until the end of the PS polling period and may be determined based on a result obtained by subtracting a backoff counter value used for transmitting the corresponding PS-Poll' from an initially set duration value of the PS polling period.

When the PS polling period is terminated, data transmission may be started after a SIFS time. During the data transmission period, the AP transmits downlink data to terminals having transmitted the PS-Poll' in the PS polling period. At this point, the AP may simultaneously transmit data to a plurality of terminals through multi-channels. On the other hand, between the PS polling period and the data transmission period, a waiting time other than a SIFS, for example, a waiting time of an AIFS may be set.

Figure 21:
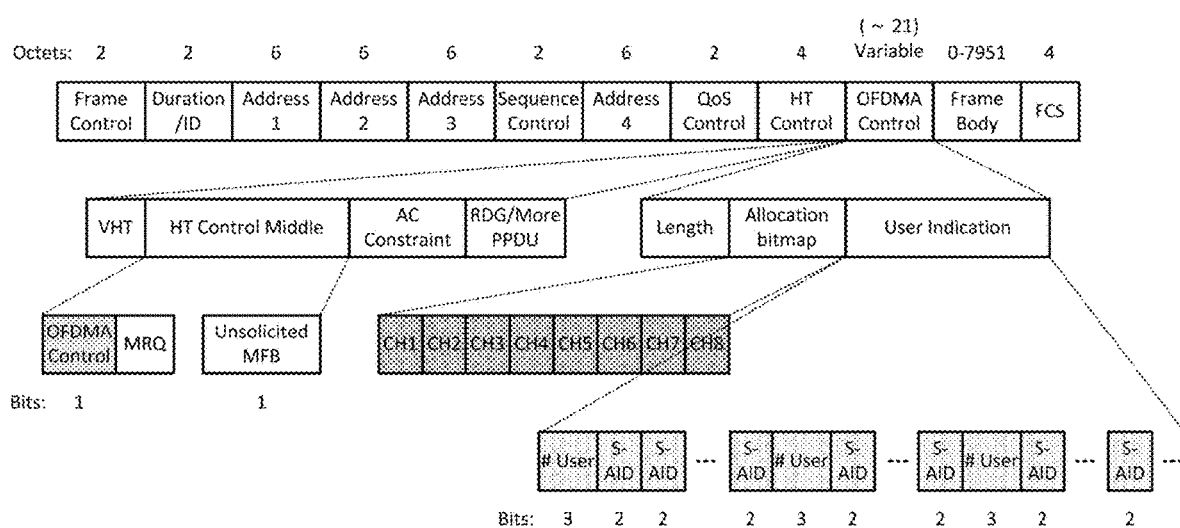

FIG. 21 illustrates an embodiment of a MAC header configuration method for indicating distributed data transmission using multi-channels. Referring to FIG. 21, a header of an A-MPDU transmitted by an AP may include available channel information and information indicating terminals allocated to the corresponding available channel. The terminals may decode only channels to which the corresponding terminals are allocated and obtain data therefrom with reference to the information included in the header.

The AP may aggregate data to be transmitted to a plurality of terminals to configure an A-MPDU and transmit the A-MPDU using multi-channels. At this point, there may occur a channel in which the AP cannot allocate according to a channel occupation status of other users. Since inverse Fourier transform/Fourier transform (IFFT/FFT) are performed for the entire band, the AP and terminals are required to obtain information about unavailable channels to process data by excluding the decoded bits in the corresponding channels. Therefore, according to an embodiment of the present invention, a MAC header of a first MPDU of the A-MPDU may include the available channel information and information indicating terminals allocated to the corresponding available channels. According to another embodiment of the present invention, the A-MPDU may be configured with data for a plurality of terminals and at this point, the available channel information and the information indicating terminals allocated to the corresponding available channels may be included in a separate MAC header added at the forefront of the A-MPDU.

Referring to FIG. 21, a MAC header of the present invention may include an OFDMA control field. The OFDMA control field may include the available channel information and the information indicating terminals allocated to the corresponding available channels, and may be set to have a variable length. According to an embodiment, one bit of a HT control field of the MAC header may be used as an OFDMA control bit. The OFDMA control bit indicates whether the OFDMA control field according to an embodiment of the present invention is included in the corresponding MAC header and when the corresponding bit is set to 1, the OFDMA control field of variable length may follow the HT control field.

The OFDMA control field may include a length field, an allocation bitmap field and a user indication field. The length field indicates total length information of the OFDMA control field of variable length and may be set to have a 1-byte length. The allocation bitmap field indicates available channel information and is set to have 1-byte length to represent availability for each of total 8 channels in units of 20 MHz. When a channel is not available, a bit corresponding to the channel may be set to 0, and when the channel is available and data is allocated thereto, the bit corresponding to the channel may be set to 1. Next, the user indication field represents information of terminals allocated to the available channels. In more detail, the user indication field may include information #User of the number of terminals allocated to each available channel and identifier information S-AID of each allocated terminal. According to an embodiment, partial information of an AID of the corresponding terminal, for example, lower 2 bits of the AID may be used as the identifier information S-AID. For example, CH1 and CH3 are indicated as available channels, and MPDUs of STA 1, 2, 3 and 4, and MPDUs of STA 5, 6 and 7 may be respectively allocated to CH1 and CH3 on an allocation bitmap. At this point, first number information #User of the user indication field may be set to 4, identifier information S-AID of STA 1, 2, 3 and 4 may follow thereafter. In addition, next number information #User of the user indication field may be set to 3 and identifier information S-AID of STA 5, 6 and 7 may follow thereafter.

Meanwhile, as another embodiment of the present invention, the user indication field may indicate an order in which an MPDU of each terminal is positioned in the A-MPDU. At this point, a terminal having obtained user indication information may divide the entire A-MDPU into a plurality of MPDUs using MPDU length information included in an MPDU delimiter and extract an MPDU of the corresponding terminal from among the divided MPDUs.

Figure 22:
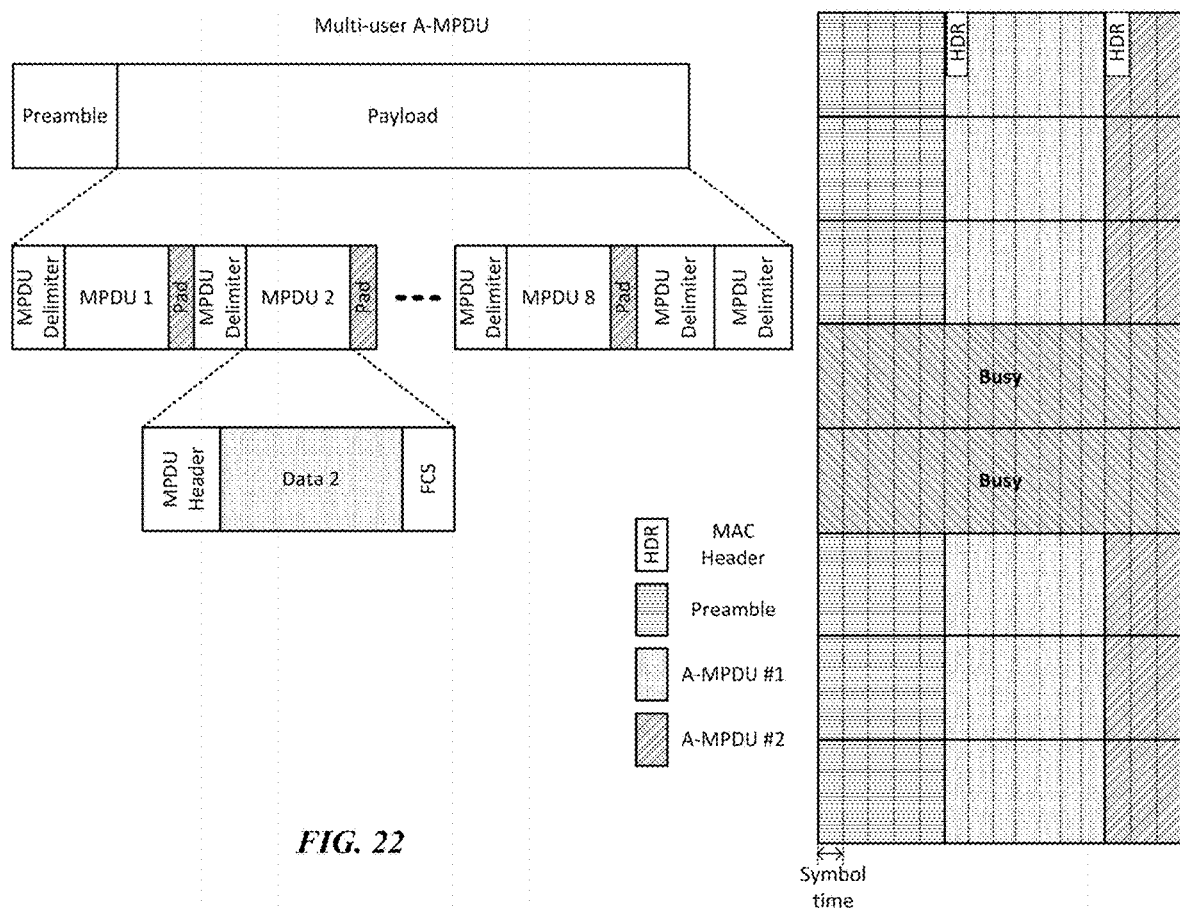

FIG. 22 illustrates another embodiment of a distributed data transmission method using multi-channels. As described above, the AP aggregates data for the terminals having transmitted the PD-Poll' to configure an A-MPDU (multi-user A-MPDU). When MPDUs to be transmitted to the plurality of terminals are aggregated to configure one A-MPDU, a preamble amount may be reduced, resulting in a reduction in overhead in comparison to the case where the A-MPDU is transmitted by each terminal. The multi-user A-MPDU configured in this way is allocated to a plurality of OFDM channels and transmitted.

In addition, according to an additional embodiment of the present invention, the multi-user A-MPDU may be configured to include a plurality of A-MPDUs A-MPDU #1 and A-MPDU #2. Referring to FIG. 22, a preamble is positioned at a start part of the multi-user A-MPDU and each of the A-MPDUs A-MPDU #1 and A-MPDU #2 are sequentially disposed thereafter. At this point, a start part of each of the A-MPDUs A-MPDU #1 and A-MPDU #2 includes a MAC header HDR according to the foregoing embodiment to indicate available channel information of the multi-user A-MPDU and terminals allocated to the corresponding available channels. Accordingly, a terminal having received the multi-user A-MPDU may determine a busy channel with reference to the MAC header HDR of each A-MPDU. In addition, the terminal may identify a channel in which an MPDU for the corresponding terminal is positioned or an order in which an MPDU for the corresponding terminal is positioned in the A-MPDU with reference to the MAC header HDR, and may extract and decode the MPDU for the corresponding terminal based on the identified information.

Figure 23:
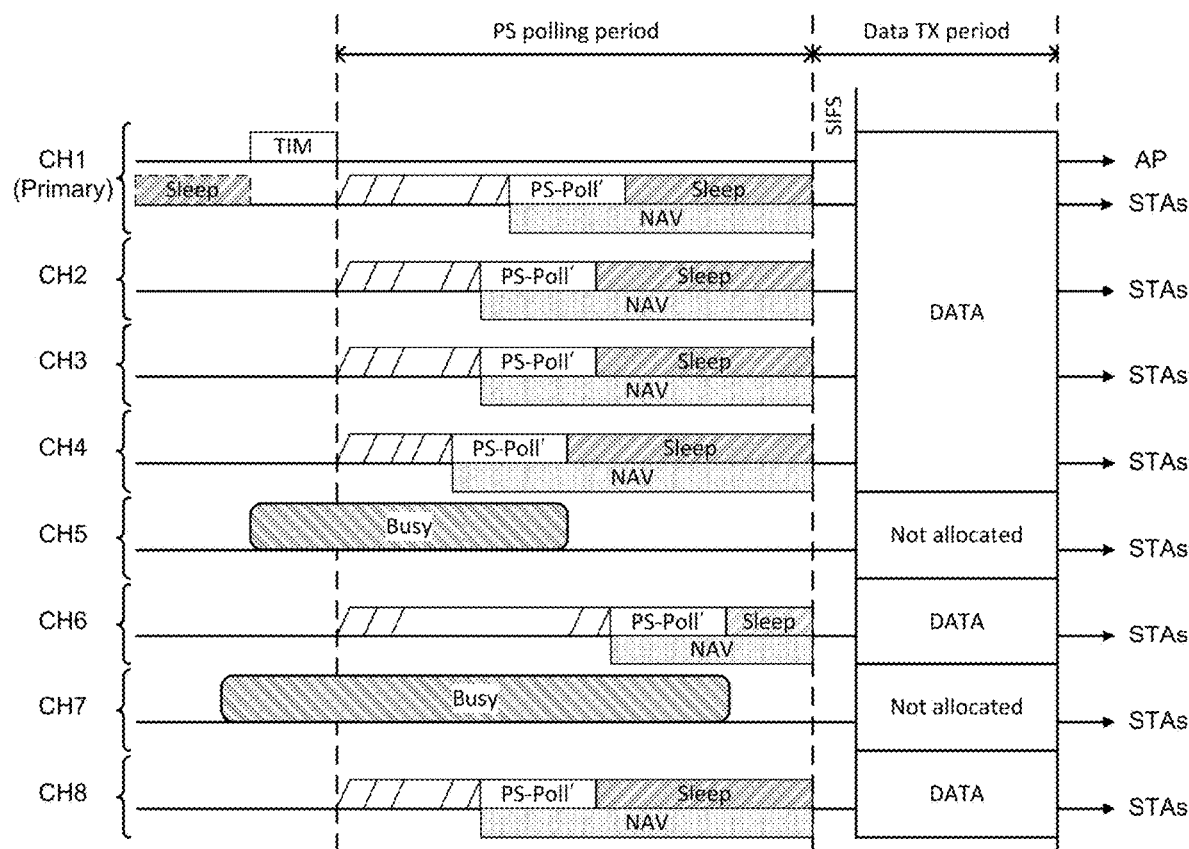
Figure 24:
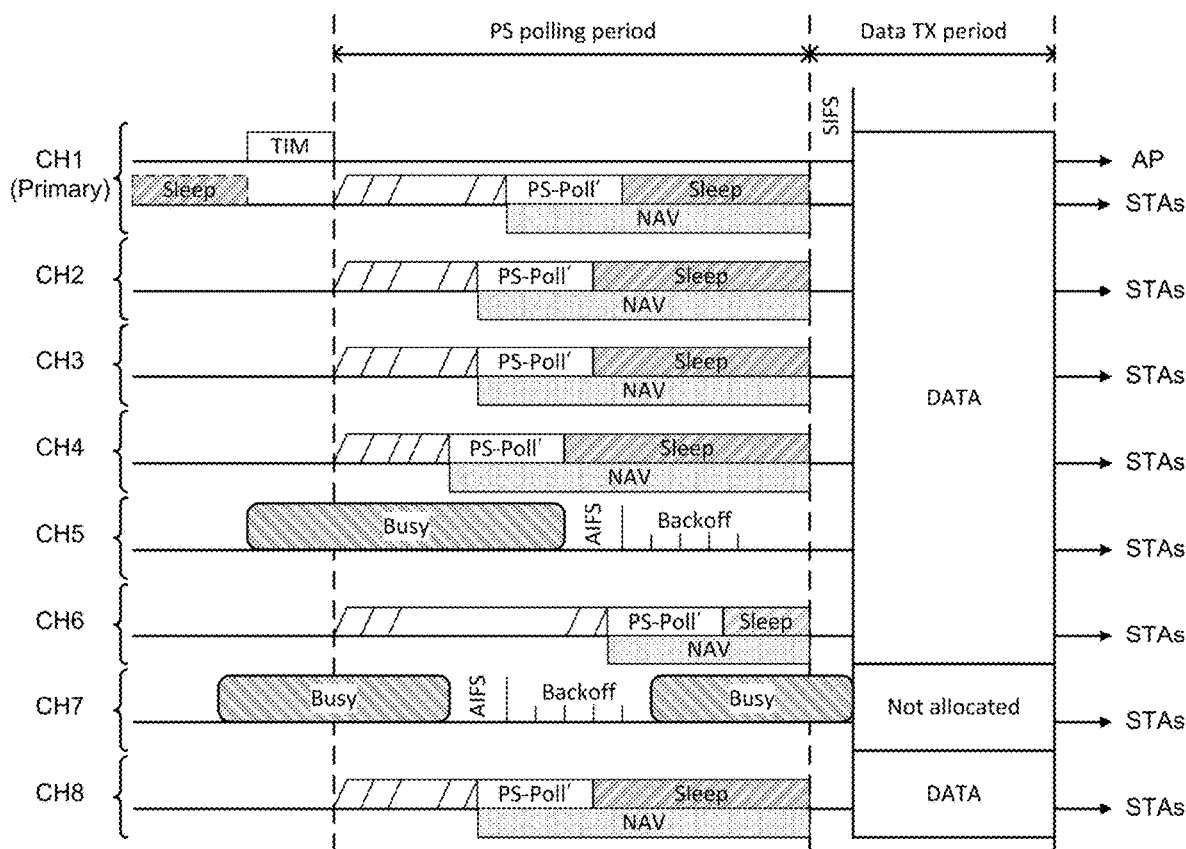
Figure 25:
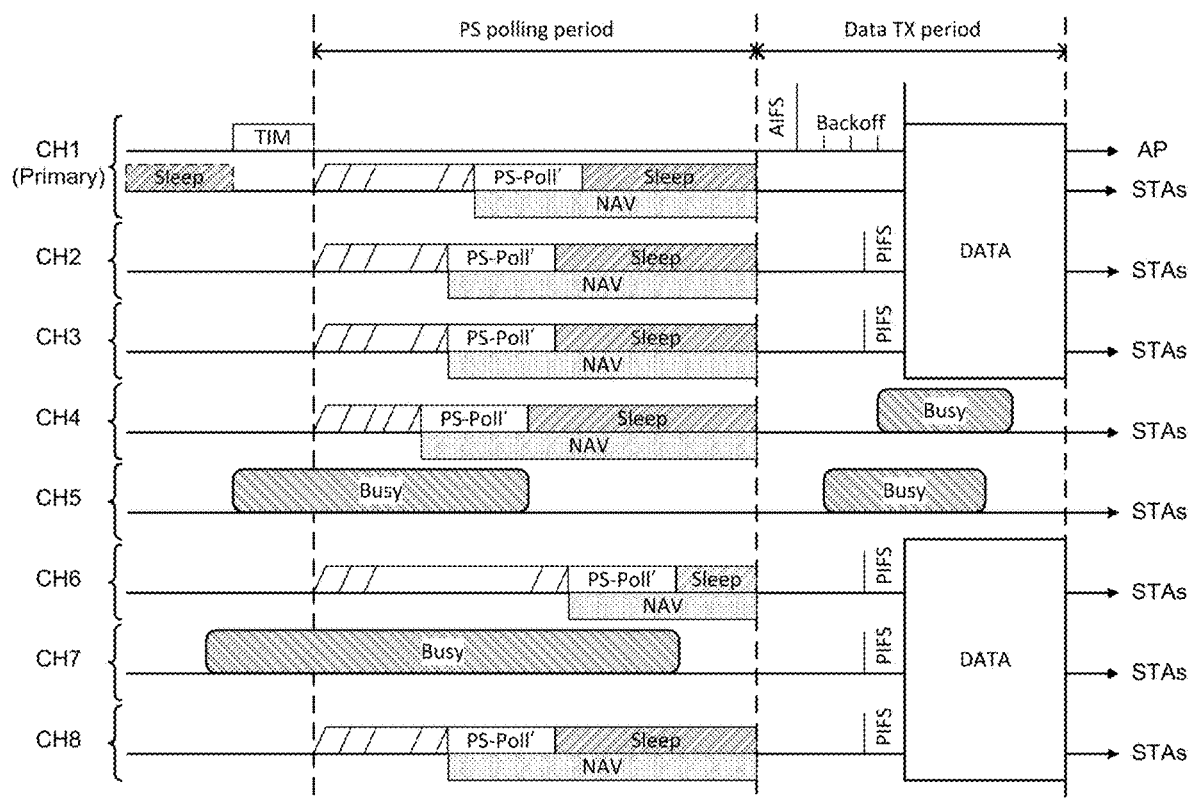

FIGS. 23 to 25 illustrate embodiments in which distributed data transmission is performed when some channels are busy in a PS polling period. First, in the embodiments of FIGS. 23 and 24, it is assumed that the PS polling period is terminated and data transmission is started after a SIFS time. In addition, in the embodiment of FIG. 25, it is assumed that a PS polling period is terminated and an AP performs a separate backoff procedure in order to perform downlink data transmission using multi-channels.

First, according to the embodiment of FIG. 23, terminals indicated that there is downlink data by TIM may be allocated with channels through which a PS-Poll' will be transmitted in the same manner as the above-described embodiment. However, like CH 5 and CH 7, when a channel allocated to a terminal is busy at a start time of a PS polling period, the corresponding terminal may be reallocated with a channel through which the PS-Poll' is to be transmitted. The terminal may determine whether each channel is idle at the start time of the PS polling period, and is reallocated with one of the determined idle channels to attempt to transmit the PS-Poll'. According to an embodiment, a new channel may be allocated based on an order that terminals are allocated to busy channels. In FIG. 23, when a specific terminal allocated to CH 5, which is in a busy state, is a fourthly allocated terminal in CH 5, the corresponding terminal may be reallocated to CH 4 that is the fourth among idle channels. According to the embodiment of FIG. 23, channels CH 5 and CH 7, which are in the busy state at a start time of a PS polling period, are excluded from an allocation target and are not to be used in the PS polling period and data transmission period.

On the other hand, according to an embodiment of FIG. 24, although a channel is busy at a start time of a PS polling period, the channel may be used in data transmission when becoming idle before a start time of a data transmission period. As described above, when the channel allocated to the terminal is busy at the start time of the PS polling period, the corresponding terminal may be reallocated with a channel through which a PS-Poll' is to be transmitted. However, when channels CH 5 and CH 7 that are not used for the PS-Poll' transmission become idle within the PS polling period, an AP may perform a backoff procedure after an AIFS time. When a channel is idle until a backoff counter of the backoff procedure expires, the corresponding channel may become a candidate channel available in the data transmission period. The AP may use a channel CH 5 that is idle even at a start time of the data transmission period among candidate channels as a channel for downlink data transmission. However, the channel CH 7, which becomes busy due to another terminal at the start time of the data transmission period among the candidate channels, is excluded from a channel for data transmission by the AP.

Next, according to an embodiment of FIG. 25, the PS polling period is terminated and the AP may perform a backoff procedure in a primary channel CH1 for data transmission. On the other hand, in other secondary channels CH2 to CH8, CCA may be performed during a PIFS time before the backoff counter expires to determine whether corresponding channels are idle. When the backoff counter expires, the AP transmits data using idle channels that are not occupied by other terminals. Referring to FIG. 25, in a PS polling period, although CH 1 to CH 4, CH 6 and CH 8 that are idle at a PS polling start time are used for PS-Poll' transmission, CH 1 to CH 3 and CH 6 to CH 8 are used for data transmission according to the above-described backoff procedure in a data transmission period. In other words, according to embodiments of FIGS. 24 and 25, channels used in a PS polling period and channels used in a data transmission period may be operated independently from each other.

Figure 26:
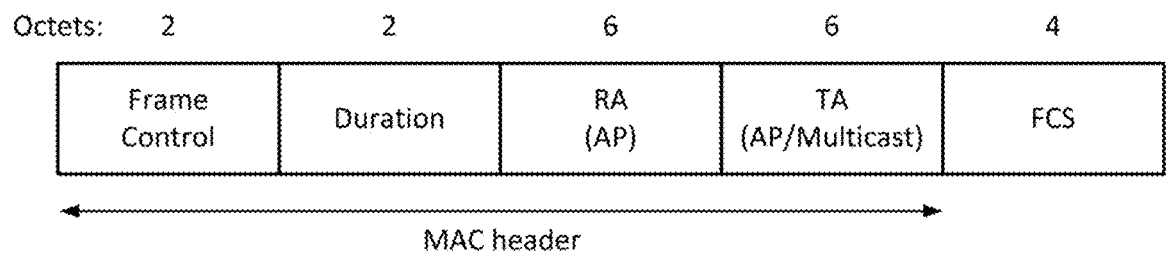
FIG. 26 illustrates an RTS-to-self frame for setting a PS polling period.

FIG. 26 illustrates a RTS-to-self (hereinafter RTS') for setting a PS polling period as another embodiment of the present invention. When a PS polling period is separately allocated according to the embodiment of the present invention, legacy terminals may not identify the duration of the corresponding PS polling period. Accordingly, the AP may transmit a separate RTS' for setting the PS polling period.

The RTS' has a frame type of RTS and according to an embodiment, both the RA and TA may be set to a MAC address of the AP. According to another embodiment, in the RTS', the RA may be set to a MAC address of the AP and the TA may be set to a predetermined multicast address for a PS-Poll. In addition, a duration field of the RTS' indicates a time until the end of the PS polling period. Accordingly, legacy terminals having received the RTS' set NAVs based on the duration field thereof.

Figure 27:
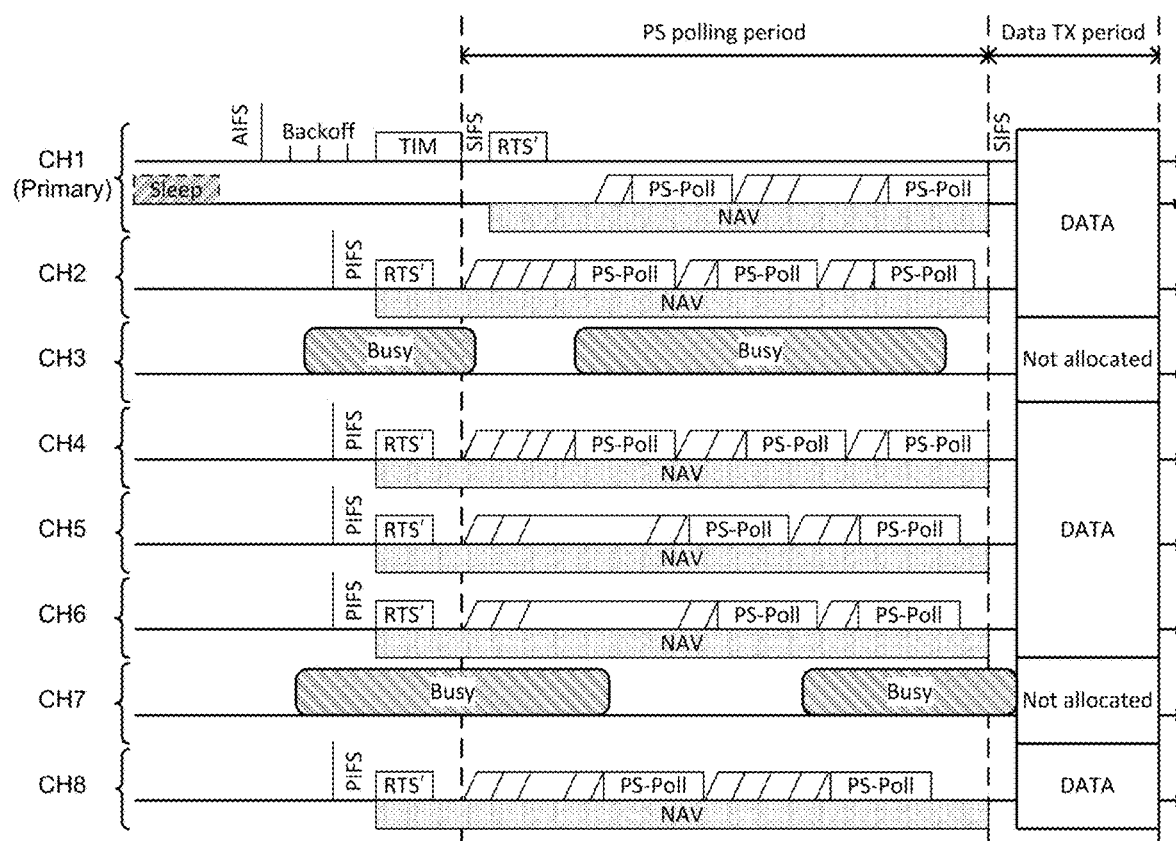
FIGS. 27 and 28 illustrate distributed data transmission methods using multi-channels according to a third embodiment of the present invention.
Figure 28:
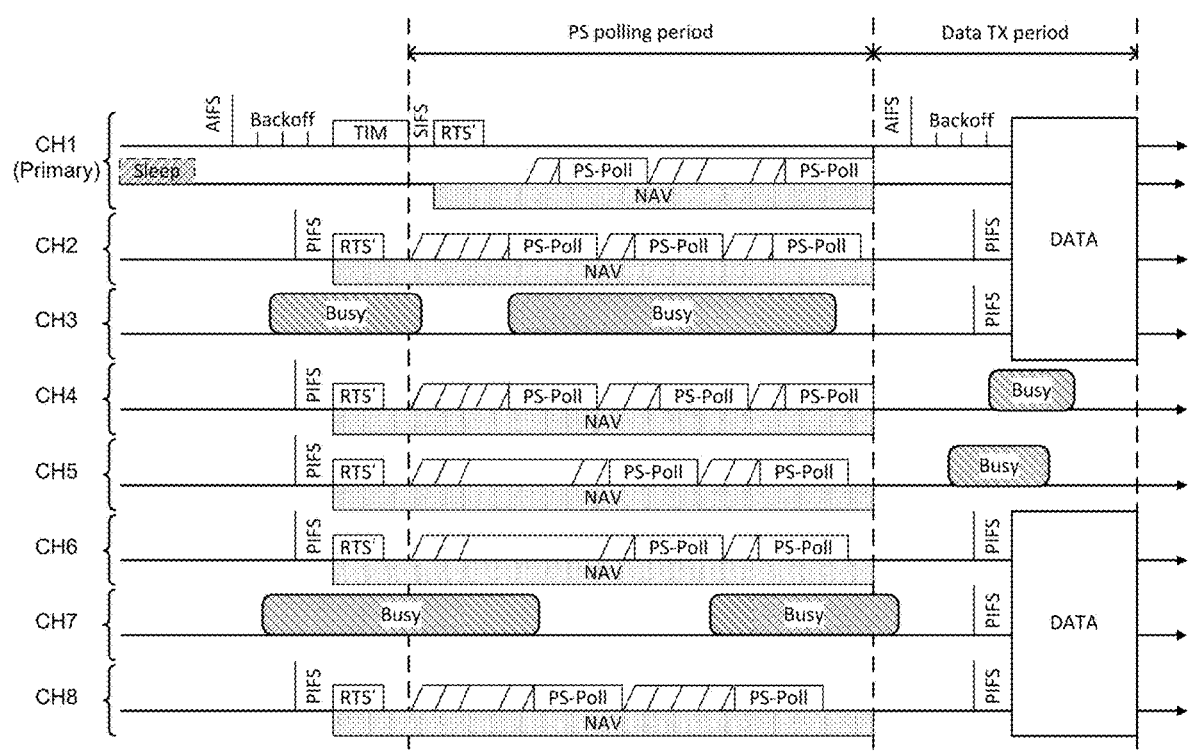

FIGS. 27 and 28 illustrate methods for performing distributed data transmission using RTS'. First, in an embodiment of FIG. 27, it is assumed that data transmission is started a SIFS time after a PS polling period is terminated, as shown in the embodiments of FIG. 23 or FIG. 24. In addition, in the embodiment of FIG. 28, it is assumed that the PS polling period is terminated and an AP performs a separate backoff procedure in order to perform downlink data transmission using multi-channels, as shown in the embodiment of FIG. 25.

In the embodiments of FIGS. 27 and 28, the AP may perform a separate backoff procedure to transmit a TIM triggering the PS polling period. At this point, the backoff procedure is performed on the primary channel CH1 and is started an AIFS time or a PIFS time after a previous sleep state of the AP is terminated. The AP performs CCA for the secondary channels CH 2 to CH 8 during a PIFS time before expiration of the backoff counter, and determines whether the corresponding channels are idle. Next, the AP transmits an RTS' through a secondary channel determined to be idle. In addition, when the backoff counter has expired, the AP transmits a TIM through the primary channel CH1 and after a SIFS, transmits the RTS'.

Legacy terminals having received the RTS' set NAVs based on a duration field of the corresponding frame. Accordingly, during the PS polling period, uplink data of the legacy terminals may be prevented from being transmitted. However, non-legacy terminals having received the RTS' do not set NAVs corresponding thereto and may contend for transmitting the PS-Poll (or PS-Poll') during the PS polling period.

Figure 29:
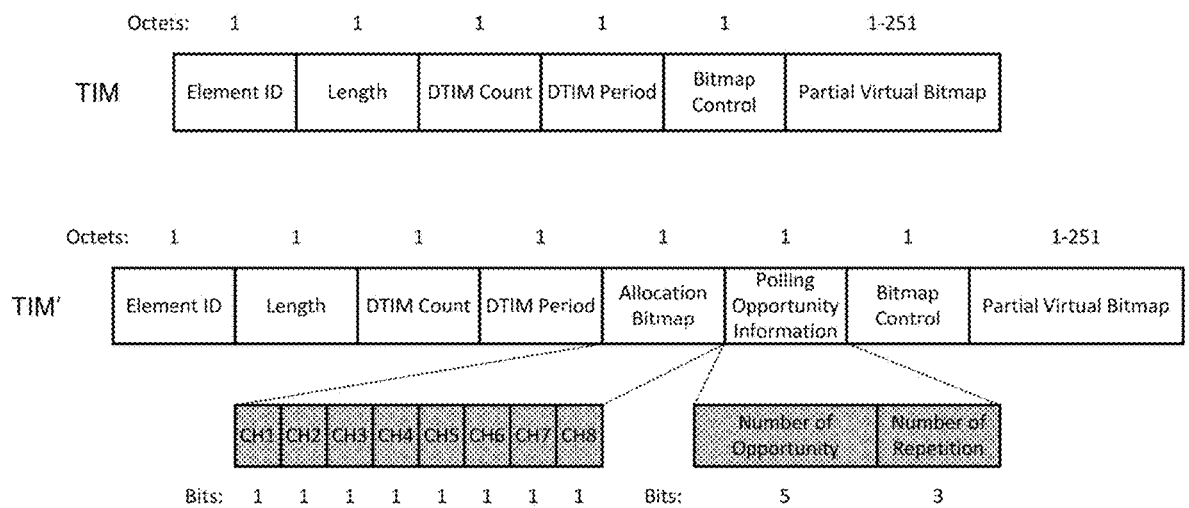
FIG. 29 illustrates another embodiment of a trigger frame for indicating downlink data to be transmitted to each terminal through multi-channels.

FIG. 29 illustrates another embodiment of a trigger frame for indicating downlink data to be transmitted to each terminal through multi-channels. Referring to FIG. 29, a TIM' in which some information is added to an existing TIM may be used as the trigger frame.

In detail, the TIM' includes an Allocation Bitmap field representing available channel information and a Polling Opportunity Information field representing information about a configuration of the PS polling period. First, the Allocation Bitmap field is set to have a 1-byte length to represent availability for each of total 8 channels in units of 20 MHz. When a channel is not available, a bit corresponding to the channel is set to 0, and when the channel is available and data is allocated thereto, the bit corresponding to the channel is set to 1. Alternatively, each bit may be set in reverse.

Next, the Polling Opportunity Information field represents information about a configuration of a PS-Poll (or PS-Poll') transmission opportunity allocated to each terminal in the PS polling period. According to an embodiment of the present invention, the PS-Poll transmission opportunities may be assigned by a predetermined slot unit such that PS-Poll transmissions by a plurality of terminals do not overlap each other during the PS polling period. In other words, the PS polling period may be configured with at least one slot and a PS-Poll transmission opportunity may be given to one terminal for each slot. In addition, the slot may be allocated for each available channel. According to an embodiment, the slot length for PS-Poll transmission may be determined as a value obtained by adding an xIFS to the time for the PS-Poll transmission. At this point, the xIFS is a margin for ensuring that the PS-Polls transmitted by terminals do not overlap each other and may be set such that twice the xIFS is shorter than an AIFS (or a DIFS). Accordingly, in case that a PS-Poll is transmitted at a starting portion of a specific slot and a PS-Poll is transmitted at an end portion of the next slot such that a corresponding channel is idle for the time of twice the xIFS, a legacy terminal may be prevented from occupying the corresponding channel.

The Polling Opportunity Information field may include a slot number field, namely, a Number of Opportunity field and a Number of Repetition field of the PS-Poll transmission. The slot number field represents information on how many slots configure a PS polling period in a time axis. In other words, the slot number field represents the number of slots allocated to each channel in the PS polling period. Accordingly, the duration of the PS polling period may be determined based on a value obtained by multiplying a slot length by the number of slots. On the other hand, the Number of Repetition field represents information about the number of times that the PS polling period is continuously repeated. When a value of the Number of Repetition field is m, each of the PS polling period and data transmission period may be sequentially repeated m times.

Figure 30:
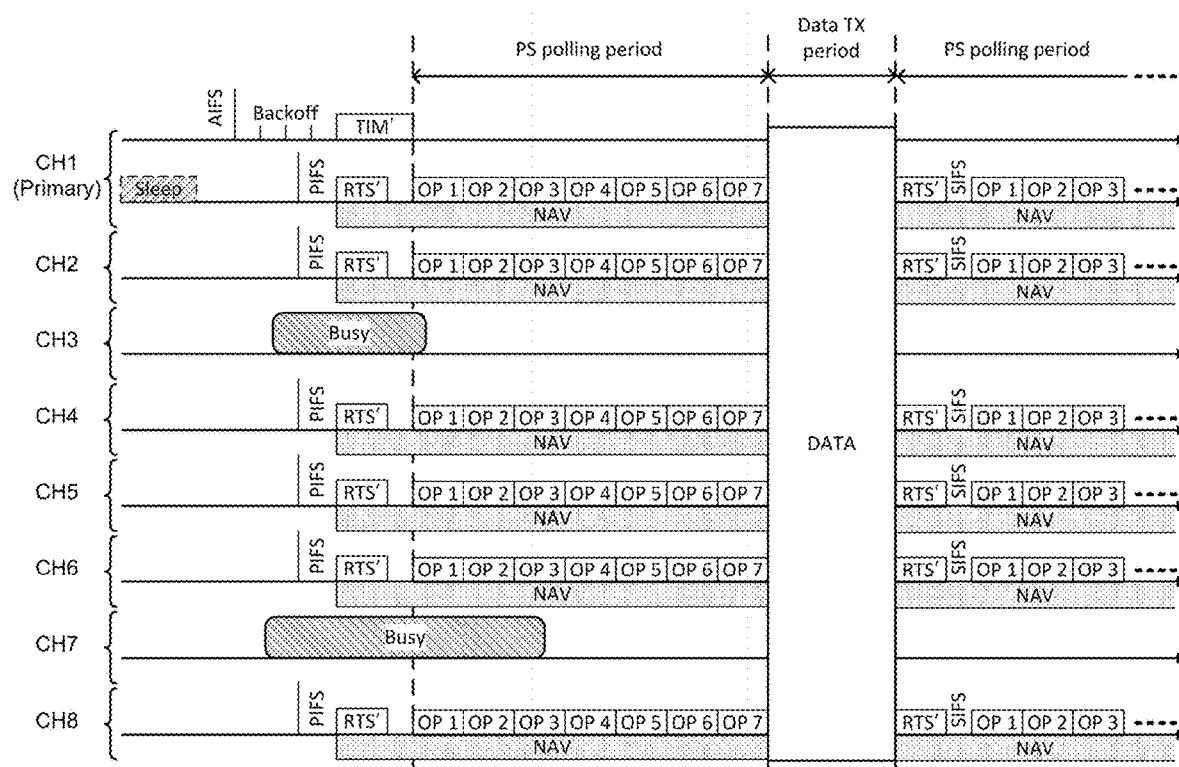
FIGS. 30 and 31 illustrate distributed data transmission methods using multi-channels according to a fourth embodiment of the present invention.
Figure 31:
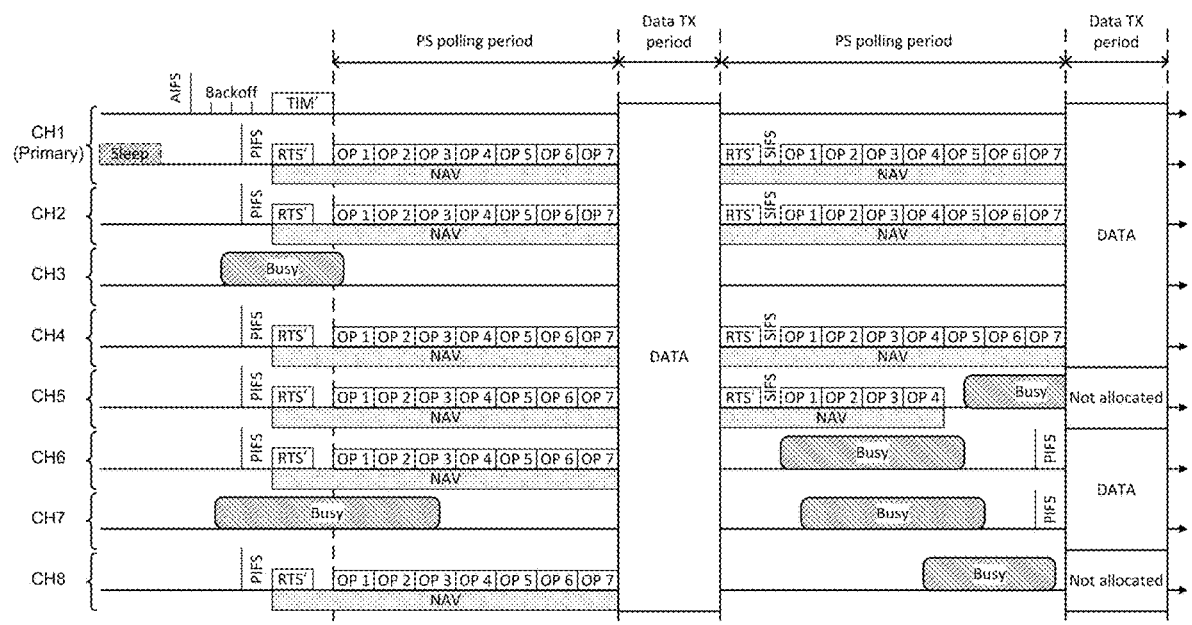

FIGS. 30 and 31 illustrate methods for performing distributed data transmission using the above-described TIM'.

First, referring to FIG. 30, an AP transmits a TIM' for triggering a PS polling period. The TIM' may be included in a beacon to be transmitted, and as shown in the above-described embodiments, the AP may perform a separate backoff procedure for transmitting the TIM'. The AP performs CCA for each channel during a PIFS before expiration of the backoff counter to determine whether each channel is idle. The AP sets an allocation bitmap of the TIM' based on the determined result. In other words, channels determined to be idle are indicated as available channels in the allocation bitmap and channels determined to be busy are indicated as unavailable channels. The AP transmits the TIM' set in this way. At this point, the AP may transmit an RTS' according to the above-described embodiment through the channels determined to be idle. Legacy terminals having received the RTS' set NAVs based on a duration field of the corresponding frame. Accordingly, during the PS polling period, the transmission of uplink data by the legacy terminals may be prevented. However, non-legacy terminals having received the RTS' do not set NAVs corresponding thereto and transmit a PS-Poll at a slot time allocated to the corresponding terminal during the PS polling period. According to an embodiment, a first slot time OP1 of the PS polling period may be started a SIFS time after the reception of the RTS'.

Each terminal having received the TIM' may obtain slot information through which the corresponding terminal transmits the PS-Poll by using information included in the TIM'. First, the terminal obtains PS polling period sequence information allocated to the corresponding terminal for PS-Poll transmission. When an order in which a specific terminal is indicated on a partial virtual bitmap of the TIM' is n, the PS polling period sequence j of the corresponding terminal may be determined as below.

$$j = \text{ceil}(n/(\text{the number of slots} \times \text{the number of available channels})) \quad \text{[Equation 2]}$$

Herein, ceil (x) denotes a minimum integer that is not smaller than x. In other words, the PS polling period sequence j of the terminal may be determined by rounding up a value obtained by dividing an order n indicated for the corresponding terminal on the partial virtual bitmap by a value obtained by multiplying the number of slots for each channel in the PS polling period by the number of available channels. For example, as illustrated in FIG. 30, when the number of slots is 7, the number of available channels CH1 to CH2, CH4 to CH6, and CH8 is 6, and n=40 for the terminal, the PS polling period sequence j of the corresponding terminal becomes ceil (40/(7×6))=1 and the corresponding terminal transmits a PS-Poll during a first PS polling period. Similarly, when n=70 for the terminal, the PS polling period sequence j of the corresponding terminal becomes ceil (70/(7×6))=2 and the corresponding terminal transmits a PS-Poll during a second PS polling period.

The terminal obtains a target channel through which the corresponding terminal transmits the PS-Poll and a target slot number in the allocated sequence j. To this end, an indication order n' in the PS polling period sequence j allocated to the corresponding terminal may be determined as below.

$$n'=n-(j-1)\times(\text{the number of slots}\times\text{the number of available channels}) \quad [\text{Equation 3}]$$

In the above-described embodiment, n'=40 in case of n=40, and n'=28 in case of n=70. In other words, the indicated order n' of the corresponding terminal in the allocated sequence j may be determined by subtracting the total number of slots till the previous sequence from an order n indicated for the corresponding terminal on the partial virtual bitmap.

Next, based on the indicated order n' in the sequence allocated to the terminal, a target channel k and a slot number s through which the corresponding terminal transmits a PS-Poll may be determined as below.

$$k=\text{ceil}(n'/\text{the number of slots}) \quad [\text{Equation 4}]$$

$$s=\text{mod}(n'-1, \text{the number of slots})+1 \quad [\text{Equation 5}]$$

Herein, the target channel number k represents a logical channel order among the available channels. In other words, the logical channel order of available channels CH1, CH2, CH4, CH5, CH6 and CH8 in the embodiment of FIG. 30 is respectively allocated as 1, 2, 3, 4, 5, and 6. For example, when n=40 for the terminal, n'=40, the target channel k is ceil(40/7)=6, and the slot number s is allocated as mod(40−1,7)+1=5. Accordingly, the corresponding terminal transmits the PS-Poll at a 5th slot time OP5 in a 6th logical channel CH8 in a first PS polling period (j=1). Similarly, when n=70 for the terminal, n'=28, the target channel k is ceil (28/7)=4, and the slot number s is allocated as mod (28−1, 7)+1=7. Accordingly, the corresponding terminal transmits a PS-Poll at a 7th slot time OP7 in a 4th logical channel CH5 in a second PS polling period (j=2). On the other hand, the target channel allocation method and slot number allocation method according to Equations 4 and 5 represent an embodiment of the present invention, but the present invention is not limited thereto. For example, according to another embodiment of the present invention, a modification may be made such that the target channel is allocated based on Equation 5 and the slot number is allocated based on Equation 4.

When the PS polling period sequence, the target channel and the slot number through which each terminal transmits a PS-Poll are determined, the terminal transmits the PS-Poll in the corresponding sequence, channel and slot time. After one PS polling period, a data transmission period corresponding thereto is started and data is transmitted to a terminal having successfully transmitted the PS-Poll during the PS polling period. As described above, the PS polling period and data transmission period are sequentially repeated based on a value of the Number of Repetition field of a TIM'.

Next, according to an embodiment of FIG. 31, when the number of terminals which will transmit PS-Poll is smaller than the number of total available channels, some of the available channels may not be used for transmitting the PS-Poll during the PS polling period. First, the number of total PS-Poll transmission opportunities may be obtained based on repetition number information, available channel (allocation bitmap) information, and slot number information indicated in the TIM'. When the number of terminals indicated on the partial virtual bitmap is smaller than the number of total PS-Poll transmission opportunities, the smaller number of slots than the number of slots per channel set in the PS polling period may be required in a channel to which a last indicated terminal is allocated.

Referring to the second PS polling period of FIG. 31, only 4 slots, which are less than the number of slots 7 allocated per channel, are necessary for PS-Poll transmission in a channel CH5 to which a last indicated terminal is allocated on the partial virtual bitmap. Accordingly, a duration field of an RTS' transmitted through a channel to which the last terminal is allocated may be adjusted based on a slot number allocated to the corresponding terminal. In other words, the duration field of the RTS' transmitted to CH5 during the second PS polling period is set until a time to a 4th slot OP4. Accordingly, in a time after the 4th slot OP4, other terminals may occupy the corresponding channel.

Moreover, since no more PS-Poll transmission is performed in channels CH6 to CH8 following the logical channel CH5 allocated to a terminal indicated last on the partial virtual bitmap, the RTS' may not be transmitted through the corresponding channels. Accordingly, CH6 to CH8 may be occupied by other terminals during the PS polling period. On the other hand, in the channels CH6 to CH8 through which the RTS' is not transmitted, CCA may be performed to determine whether the corresponding channels are idle for a PIFS time before the data transmission period is started. When the corresponding channel is idle, the AP may allocate data thereto and when the corresponding channel is busy, the AP may exclude the corresponding channel from data allocation.

In this way, according to an embodiment of the present invention, a plurality of terminals may perform non-contention-based data transmission during a determined period. In other words, each terminal may not perform contention such as a backoff procedure and may transmit a PS-Poll using a target channel and target slot time allocated to each terminal.

Although the present invention is described by using the wireless LAN communication as an example, the present invention is not limited thereto and the present invention may be similarly applied even to other communication systems such as cellular communication, and the like. Further, the method, the apparatus, and the system of the present invention are described in association with the specific embodiments, but some or all of the components and operations of the present invention may be implemented by using a computer system having universal hardware architecture.

The detailed described embodiments of the present invention may be implemented by various means. For example, the embodiments of the present invention may be implemented by a hardware, a firmware, a software, or a combination thereof.

In case of the hardware implementation, the method according to the embodiments of the present invention may be implemented by one or more of Application Specific Integrated Circuits (ASICS s), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and the like.

In case of the firmware implementation or the software implementation, the method according to the embodiments of the present invention may be implemented by a module, a procedure, a function, or the like which performs the operations described above. Software codes may be stored in a memory and operated by a processor. The processor may be equipped with the memory internally or externally and the memory may exchange data with the processor by various publicly known means.

The description of the present invention is used for exemplification and those skilled in the art will be able to understand that the present invention can be easily modified to other detailed forms without changing the technical idea or an essential feature thereof. Thus, it is to be appreciated that the embodiments described above are intended to be illustrative in every sense, and not restrictive. For example, each component described as a single type may be implemented to be distributed and similarly, components described to be distributed may also be implemented in an associated form.

The scope of the present invention is represented by the claims to be described below rather than the detailed description, and it is to be interpreted that the meaning and scope of the claims and all the changes or modified forms derived from the equivalents thereof come within the scope of the present invention.

MODE FOR INVENTION

As above, related features have been described in the best mode.

INDUSTRIAL APPLICABILITY

Various exemplary embodiments of the present invention have been described with reference to an IEEE 802.11 system, but the present invention is not limited thereto and the present invention can be applied to various types of mobile communication apparatus, mobile communication system, and the like.

The invention claimed is:

1. A wireless communication terminal, the wireless communication terminal comprising:
   a transceiver; and
   a processor, wherein the processor is configured to:
   receive a first trigger frame for soliciting uplink transmission of one or more terminals from an access point (AP), and
   transmit a power save (PS)-poll frame in response to the first trigger frame,
   wherein the first trigger frame is received during a specific time when a state of the wireless communication terminal is in an awake state, and
   wherein the PS-poll frame is transmitted together with one or more other uplink frames transmitted from one or more other terminals in response to the first trigger frame.

2. The wireless communication terminal of claim 1, wherein the processor is further configured to:
   receive a downlink frame in response to the PS-poll frame,
   wherein the downlink frame is transmitted from the AP when the PS-poll is successfully transmitted to the AP.

3. The wireless communication terminal of claim 1,
   wherein the first trigger frame includes a-specific information soliciting whether a second trigger frame is transmitted continuously after a transmission of the first trigger frame.

4. The wireless communication terminal of claim 3,
   wherein the first trigger frame and the second trigger frame are transmitted within the specific time.

5. A wireless communication method of a terminal, the wireless communication method comprising:
   receiving a first trigger frame for soliciting uplink transmission of one or more terminals from an access point (AP); and
   transmitting a power save (PS)-poll frame in response to the first trigger frame,
   wherein the first trigger frame is received during a specific time when a state of the wireless communication terminal is in an awake state, and
   wherein the PS-poll frame is transmitted together with one or more other uplink frames transmitted from one or more other terminals in response to the first trigger frame.

6. The wireless communication method of claim 5, the method further comprising:
   receiving a downlink frame in response to the PS-poll frame,
   wherein the downlink frame is transmitted from the AP when the PS-poll is successfully transmitted to the AP.

7. The wireless communication method of claim 5:
   wherein the first trigger frame includes a-specific information soliciting whether a next trigger frame is transmitted continuously after a transmission of the first trigger frame.

8. The wireless communication method of claim 7,
   wherein the first trigger frame and the second trigger frame are transmitted within the specific time.

* * * * *